(12) United States Patent
Hiramatsu

(10) Patent No.: US 12,261,461 B2
(45) Date of Patent: Mar. 25, 2025

(54) POWER TRANSMISSION APPARATUS, CONTROL METHOD, AND COMPUTER-READABLE STORAGE MEDIUM

(71) Applicant: CANON KABUSHIKI KAISHA, Tokyo (JP)

(72) Inventor: Tomoki Hiramatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/668,850

(22) Filed: May 20, 2024

(65) Prior Publication Data

US 2024/0313587 A1   Sep. 19, 2024

Related U.S. Application Data

(63) Continuation of application No. 17/681,535, filed on Feb. 25, 2022, now Pat. No. 12,021,396, which is a continuation of application No. PCT/JP2020/032926, filed on Aug. 31, 2020.

(30) Foreign Application Priority Data

Sep. 4, 2019 (JP) .................................. 2019-161463

(51) Int. Cl.
*H02J 50/80* (2016.01)
*H02J 7/00* (2006.01)
*H02J 50/10* (2016.01)
*H02J 50/60* (2016.01)

(52) U.S. Cl.
CPC .......... *H02J 50/80* (2016.02); *H02J 7/00712* (2020.01); *H02J 50/10* (2016.02); *H02J 50/60* (2016.02)

(58) Field of Classification Search
CPC .. H02J 50/80; H02J 50/10; H02J 50/60; H02J 7/00712
See application file for complete search history.

(56) References Cited

U.S. PATENT DOCUMENTS 12,021,396 B2 *   6/2024   Hiramatsu .......... H02J 7/00712

* cited by examiner

*Primary Examiner* — Jeffrey M Shin
(74) *Attorney, Agent, or Firm* — Canon U.S.A., Inc. IP Division

(57) ABSTRACT

A power transmission apparatus configured to wirelessly transmit power to a power reception apparatus executes, when wirelessly transmitting power, detection processing for detecting an object different from the power reception apparatus, using a power loss, obtains, from the power reception apparatus, reference value information regarding a reference value of received power used to obtain the power loss, and performs a specific control after the power loss has been obtained and in a case where a predetermined time has elapsed since a predetermined timing associated with a timing at which information is obtained from the power reception apparatus, without obtaining the reference value information that is valid, the specific control being a control to prevent a power transmission output from being increased, regardless of received power in the power reception apparatus.

12 Claims, 14 Drawing Sheets

POWER TRANSMISSION APPARATUS, CONTROL METHOD, AND COMPUTER-READABLE STORAGE MEDIUM

CROSS-REFERENCE TO RELATED APPLICATIONS

This application is a Continuation of U.S. patent application Ser. No. 17/681,535 filed Feb. 25, 2022, which is a Continuation of International Patent Application No. PCT/JP2020/032926, filed Aug. 31, 2020, which claims the benefit of Japanese Patent Application No. 2019-161463 filed Sep. 4, 2019, both of which are hereby incorporated by reference herein in their entireties.

BACKGROUND

Technical Field

The present disclosure relates to a technique for controlling transmission power and received power in wireless power transfer.

Background Art

Techniques for wireless power transfer systems have been widely developed. Japanese Patent Laid-Open No. 2015-165761 describes a method by which a foreign object, which is an object different from a power reception apparatus, is detected during power transmission and reception compliant with a standard (WPC standard) stipulated by the Wireless Power Consortium (WPC), which is a standardization organization of wireless charging standards. In this method, received power at a time point in the past and received power at the present time point are compared, and it is determined that a foreign object is present if there is no increase in the received power despite the fact that control to increase the transmission power has been performed, or if there is no decrease in the received power despite the fact that control to reduce the transmission power has been performed.

It can be envisaged that, due to a change in the power transmission and reception environment, for example, the received power gradually changes even if the same power is transmitted. At this time, if, despite the fact that there is a significant time difference between a time point in the past and the present time point, foreign object detection is performed using information at the time point in the past, the accuracy of the foreign object detection may be reduced. This may result in various problems that can reduce convenience, including, for example, stopping of charging due to erroneous detection, and a temperature increase caused by failing to detect a foreign object that is present.

SUMMARY

The present disclosure provides a technique for improving convenience of wireless power transfer.

A power transmission apparatus according to an aspect of the present disclosure includes: a power transmission unit configured to wirelessly transmit power to a power reception apparatus; a communication unit configured to communicate with the power reception apparatus; a processing unit configured to execute, when wirelessly transmitting power using the power transmission unit, detection processing for detecting an object different from the power reception apparatus, using a power loss; an obtaining unit configured to obtain, using the communication unit, from the power reception apparatus, reference value information regarding a reference value of received power that is used to obtain the power loss; and a control unit configured to perform a specific control after the power loss has been obtained and in a case where a predetermined time has elapsed since a predetermined timing associated with a timing at which information is obtained from the power reception apparatus, without obtaining the reference value information that is valid, the specific control being a control to prevent an output power using the power transmission unit from being increased, regardless of received power of the power reception apparatus.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the present disclosure and, together with the description, serve to explain principles of the present disclosure.

DESCRIPTION OF THE EMBODIMENTS

Figure 1:
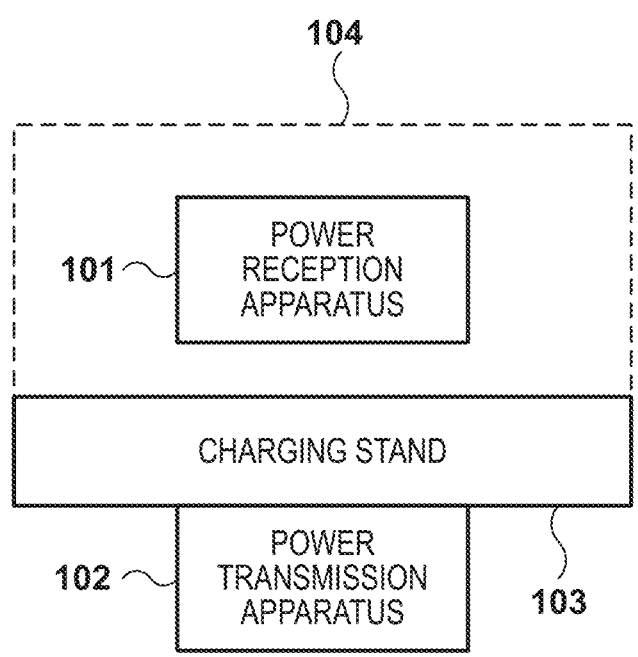
FIG. 1 is a diagram showing a configuration of a wireless charging system.

Hereinafter, embodiments will be described in detail with reference to the attached drawings. Note, the following embodiments are not intended to limit the scope of the present disclosure. Multiple features are described in the embodiments, but limitation is not made to the present disclosure that requires all such features, and multiple such features may be combined as appropriate. Furthermore, in the attached drawings, the same reference numerals are given to the same or similar configurations, and redundant description thereof is omitted.

(Configuration of System)

FIG. 1 shows a configuration example of a wireless charging system (wireless power transfer system) according to the present embodiment. In an example, the present system includes a power reception apparatus 101 and a power transmission apparatus 102. In the following, the power reception apparatus 101 may be referred to as the "RX", and the power transmission apparatus 102 may be referred to as the "TX". The RX is an electronic apparatus that receives power from the power transmission apparatus 102, and charges an internal battery. The TX is an electronic apparatus that wirelessly transmits power to the RX placed on a charging stand 103. A range 104 indicates a range in which the RX can receive power transmitted from the TX. The RX and the TX may have the function for executing an application other than wireless charging. One example of the RX is a smartphone, and one example of the TX is an accessory apparatus for charging the smartphone. The RX and the TX may each be a storage apparatus such as a hard disk apparatus and a memory apparatus, or may be an information processing apparatus such as a personal computer (PC). Alternatively, the RX and the TX each may be an image input apparatus such as an image capturing apparatus (a camera, a video camera, etc.) and a scanner, or may be an image output apparatus such as a printer, a copier, and a projector. Alternatively, the TX may be a smartphone. In this case, the RX may be another smartphone, or may be a peripheral apparatus such as a wireless earphone. Alternatively, the RX may be an automobile. Alternatively, the TX may be a charger installed in a console or the like in the automobile.

The present system performs wireless power transfer using an electromagnetic induction method for wireless charging in accordance with a WPC standard prescribed by the WPC (Wireless Power Consortium). That is, the RX and the TX perform wireless power transfer for wireless charging in accordance with the WPC standard between a power reception coil of the RX and a power transmission coil of the TX. The method for the wireless power transfer is not limited to the method defined in the WPC standard, and may be another electromagnetic induction method, a magnetic resonance method, an electric field resonance method, a microwave method, or a method using laser or the like. Although wireless power transfer is used for wireless charging in the present embodiment, wireless power transfer may be performed for a usage other than wireless charging.

In the WPC standard, power that is guaranteed when the RX receives power from the TX is defined by a value called "Guaranteed Power" (hereinafter referred to as a "GP"). The GP represents a value of power guaranteed to be output to a load, such as a charging circuit, of the RX even if the power transmission efficiency between the power reception coil and the power transmission coil is reduced, for example, owing to variation in the positional relationship between the RX and the TX. For example, when the GP is 5 W, the TX performs power transmission while performing control such that 5 W can be output to the load in the RX, even if the power transmission efficiency is reduced owing to variation in the positional relationship between the power reception coil and the power transmission coil.

The RX and the TX according to the present embodiment perform communication for power transmission/reception control in accordance with the WPC standard, and communication for device authentication. Here, the communication for power transmission/reception control in accordance with the WPC standard will be described.

The WPC standard defines a plurality of phases, including a Power Transfer phase in which power transfer is performed, and phases before the actual power transfer is performed, and communication for power transmission/reception control necessary for each phase is performed. The phases before power transfer includes a Selection phase, a Ping phase, a Configuration phase, a Negotiation phase, and a Calibration phase. In the Selection phase, the TX intermittently transmits an Analog Ping, and detects that an object is present in a power transmittable range (e.g., that the power reception apparatus 101, a conductor strip, or the like is placed on the charging stand 103). In the Ping phase, the TX transmits a Digital Ping, and recognizes that the detected object is the RX by receiving a response from an RX that has received the Digital Ping. In the Configuration phase, the RX notifies the TX of identification information and capability information. In the Negotiation phase, a negotiation for determining a value of the GP based on a value of GP that is requested from the RX, the power transmission capability of the TX, or the like is performed. In the Calibration phase, the RX notifies the TX of a received power value in accordance with the WPC standard, and the TX performs adjustment for performing foreign object detection during power transmission. In the Power Transfer phase, control for, for example, continuing power transmission, and stopping power transmission due to an error or full charge is performed. The TX and the RX perform communication for these power transmission and reception controls, using In-band communication in which signals are superposed using the same antennas (coils) used for wireless power transfer in accordance with the WPC standard. The range in which the In-band communication in accordance with the WPC standard can be performed between the TX and the RX is substantially the same as the power transmittable range. That is, in FIG. 1, the range 104 indicates a range in which wireless power transfer and In-band communication can be performed using the power transmission and reception coils of the TX and the RX. In the following description, the RX being "placed" means the RX having entered inside the range 104, and includes the RX in the state of not being actually placed on the charging stand 103.

The TX and the RX may perform communication (Out-of-band communication) for power transmission/reception control, using antennas (coils) that are different from those used for wireless power transfer. Examples of the communication using antennas (coils) that are different from those used for wireless power transfer include a communication method compliant with the Bluetooth (registered trademark) Low Energy standard. Alternatively, another communication method such as the IEEE 802.11 standard wireless LAN (e.g., Wi-Fi (registered trademark), ZigBee, and NFC (Near Field Communication) may be used. The communication using antennas (coils) that are different from those used for wireless power transfer may be performed with a frequency that is different from that frequency used for wireless power transfer.

In the present embodiment, prior to determining a GP, the RX performs challenge-response communication using an electronic certificate with the TX, and performs device authentication on the TX. That is, the RX performs communication for device authentication for the TX. Then, based on a result of the device authentication, the RX determines a GP that is to be requested from the TX in the Negotiation phase described above. For example, the RX determines a GP that is to be requested from the TX for which the device authentication has succeeded, as 15 W, and determines the GP that is to be requested from the TX for which the device authentication has not succeeded, as 5 W. The GP that is to be requested from the TX is not limited to a combination of 15 W and 5 W. For example, it is possible to use a combination of any values in which a GP that is to be requested from a TX for which the device authentication has succeeded is larger than a GP that is to be requested from a TX for which the device authentication has not succeeded. Thus, the RX may perform power transmission/reception with a large GP only with a TX for which device authentication has succeeded. By determining the GP based on a result of the device authentication in this manner, the RX is allowed to receive power with a large GP only from a TX that has passed a predetermined test defined in the WPC standard or the like, and that is acknowledged as being capable of transmitting power with a large GP.

(Apparatus Configuration)

Next, a configuration of the power reception apparatus 101(RX) and the power transmission apparatus 102 (TX) according to the present embodiment will be described. The components described below are merely examples. Some (possibly all) of the described components may be replaced by another configuration serving the same function, or may be omitted, and a further component may be added to the described components. Furthermore, one block described in the following description may be divided into a plurality of blocks, and a plurality of blocks may be integrated into one block.

Figure 2:
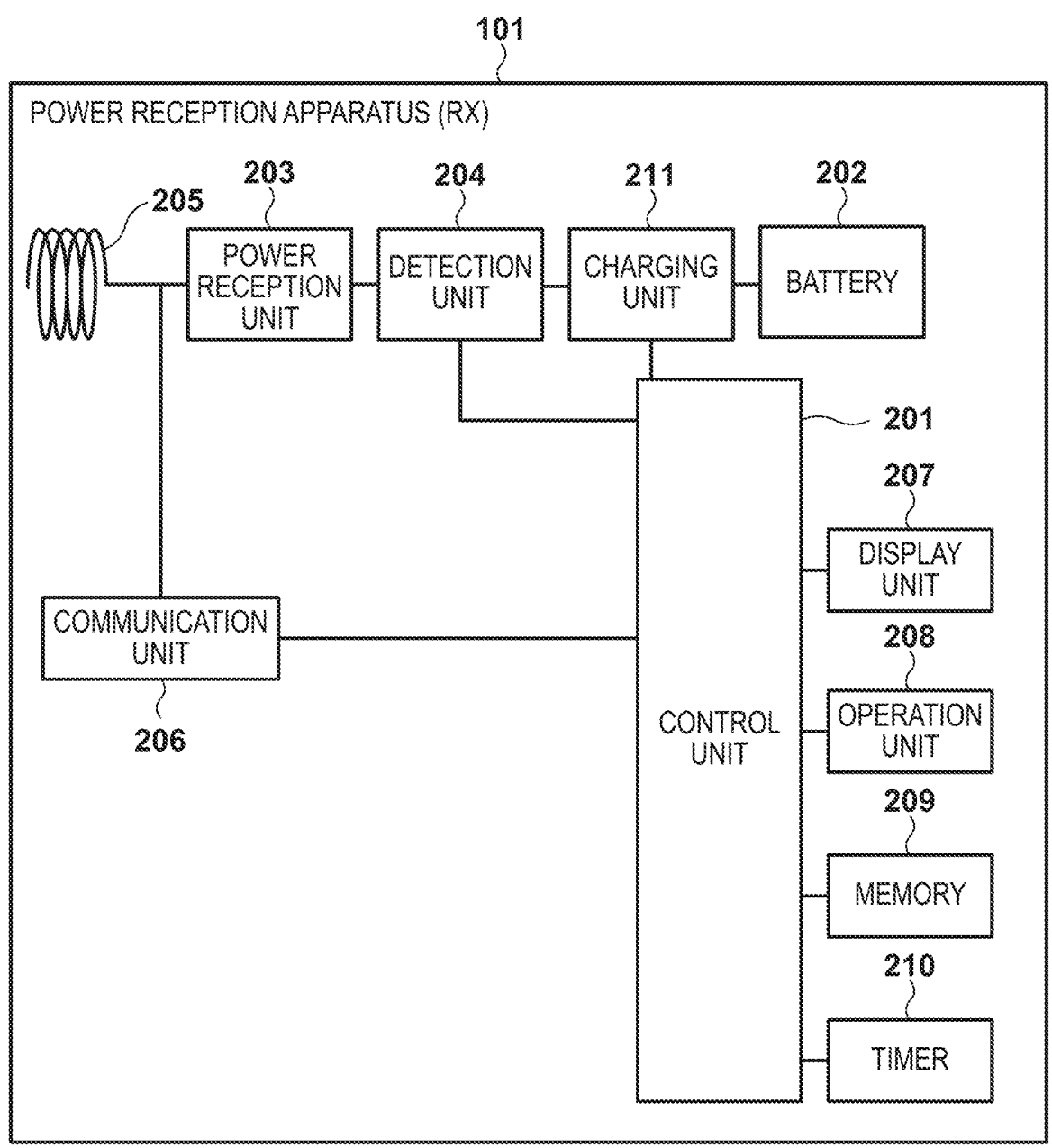
FIG. 2 is a diagram showing a configuration example of a power reception apparatus.

FIG. 2 is a diagram showing a configuration example of the RX according to the present embodiment. In an example, the RX includes a control unit 201, a battery 202, a power reception unit 203, a detection unit 204, a power reception coil 205, a communication unit 206, a display unit 207, an operation unit 208, a memory 209, a timer 210, and a charging unit 211.

The control unit 201 performs overall control of the RX by executing a control program stored in the memory 209, for example. In an example, the control unit 201 performs control necessary for the device authentication and the power reception in the RX. The control unit 201 may perform control for executing an application other than wireless power transfer. The control unit 201 includes, for example, one or more processors such as a central processing unit (CPU) and a micro processing unit (MPU). The control unit 201 may include hardware dedicated to specific processing such as an application specific integrated circuit (ASIC), and an array circuit compiled to execute predetermined processing, such as a field-programmable gate array (FPGA). The control unit 201 causes the memory 209 to store information that is to be stored while various types of processing are being executed. In addition, the control unit 201 may measure time using the timer 210.

The battery 202 supplies, to the entire RX, power required to perform control, power reception, and communication. In addition, the battery 202 stores the power received via the power reception coil 205. In the power reception coil 205, induced electromotive force is generated by electromagnetic waves that have been emitted from a power transmission coil 305 of the TX, and the power reception unit 203 obtains the power generated in the power reception coil 205. The power reception unit 203 obtains alternating-current power that has been generated through electromagnetic induction in the power reception coil 205. Then, the power reception unit 203 converts the alternating-current power into direct-current power, or alternating-current power at a predetermined frequency, and outputs the power to the charging unit 211 that executes processing for charging the battery 202. That is, the power reception unit 203 supplies power to a load of the RX. The GP described above is power that is guaranteed to be output from the power reception unit 203.

The detection unit 204 detects, in accordance with the WPC standard, whether or not the RX is placed in the range 104 in which power can be received from the TX. For example, the detection unit 204 detects a voltage value or a current value of the power reception coil 205 when the power reception unit 203 has received a Digital Ping of the WPC standard via the power reception coil 205. For example, the detection unit 204 may determine that the RX is placed in the range 104 if the voltage falls below a predetermined voltage threshold, or the current value exceeds a predetermined current threshold.

The communication unit 206 performs control communication in accordance with the WPC standard as described above with the TX, using In-band communication. The communication unit 206 demodulates electromagnetic waves that have been input from the power reception coil 205, to obtain the information transmitted from the TX, and superposes, on the electromagnetic waves, the information to be transmitted to the TX by performing load modulation on the electromagnetic waves, thereby communicating with the TX. That is, the communication performed by the communication unit 206 is performed by superposing the information on the power transmitted from the power transmission coil 305 of the TX. The communication unit 206 may perform Out-of-band communication with the TX.

The display unit 207 presents the information to the user by any method such as a visual, audio, or tactile method. For example, the display unit 207 notifies the user of the state of the RX, or the state of the wireless power transfer system including the TX and the RX as shown in FIG. 1. The display unit 207 includes, for example, a liquid crystal display, an LED, a speaker, a vibration generation circuit, or another notification device. The operation unit 208 has accepting functionality of accepting an operation to the RX from the user. The operation unit 208 includes, for example, an audio input device such as a button, a keyboard, and a microphone, a motion detection device such as an acceleration sensor and a gyrosensor, or another input device. A device in which the display unit 207 and the operation unit 208 are integrated into one piece, such as a touch panel, may be used. As described above, the memory 209 stores various types of information. The memory 209 may store information obtained by a functional unit that is different from the control unit 201. The timer 210 measures time using, for example, a count up timer that measures the time elapsed from a time at which the timer was started, a countdown timer that counts down from a set time, or the like.

Figure 3:
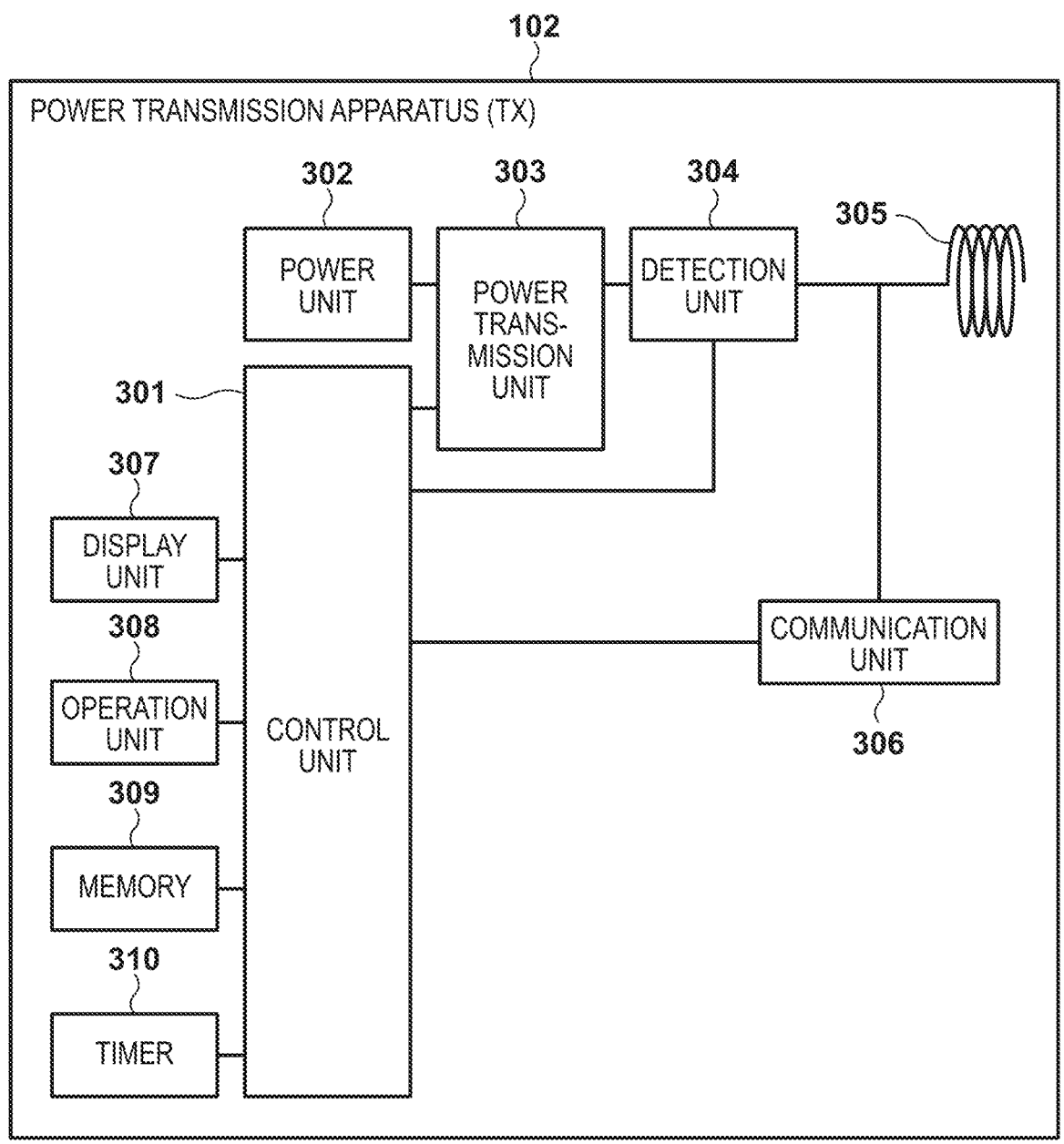
FIG. 3 is a diagram showing a configuration example of a power transmission apparatus.

FIG. 3 is a diagram showing a configuration example of the TX according to the present embodiment. In an example, the TX includes a control unit 301, a power unit 302, a power transmission unit 303, a detection unit 304, a power transmission coil 305, a communication unit 306, a display unit 307, an operation unit 308, a memory 309, and a timer 310.

The control unit 301 performs overall control of the TX by executing a control program stored in the memory 309, for example. In an example, the control unit 301 performs control necessary for the device authentication and the power transmission in the TX. The control unit 301 may perform control for executing an application other than wireless power transfer. The control unit 301 includes, for example, one or more processors such as a central processing unit (CPU) and a micro processing unit (MPU). The control unit 301 may include hardware dedicated to specific processing such as an application specific integrated circuit (ASIC), and an array circuit compiled to execute predetermined processing, such as a field-programmable gate array (FPGA). The control unit 301 causes the memory 309 to store information that is to be stored while various types of processing are being executed. In addition, the control unit 301 may measure time using the timer 310.

The power unit 302 supplies, to the entire TX, power required to perform control, power transmission, and communication. The power unit 302 is a commercial power supply or a battery, for example.

The power transmission unit 303 converts direct current or alternating-current power that is input from the power unit 302, into alternating-current frequency power with a frequency band used for wireless power transfer, and inputs the alternating-current frequency power to the power transmission coil 305, thereby generating electromagnetic waves that are to be received by the RX. The frequency of the alternating-current power generated by the power transmission unit 303 is several hundred kHz (e.g., 110 kHz to 205 kHz). In accordance with an instruction from the control unit 301, the power transmission unit 303 inputs the alternating-current frequency power to the power transmission coil 305 such that electromagnetic waves for transmitting power to the RX are output from the power transmission coil 305. The power transmission unit 303 regulates the voltage (transmission voltage) or the current (transmission current) that is input to the power transmission coil 305, thereby controlling the intensity of the electromagnetic waves to be output. When the transmission voltage or the transmission current is increased, the intensity of the electromagnetic waves is increased. When the transmission voltage or the transmission current is reduced, the intensity of the electromagnetic waves is reduced. In accordance with an instruction from the control unit 301, the power transmission unit 303 controls the output of the alternating-current frequency power such that the power transmission from the power transmission coil 305 is started or stopped.

The detection unit 304 detects, in accordance with the WPC standard, whether or not an object is present in the range 104. For example, the detection unit 304 detects a voltage value or a current value of the power transmission coil 305 when the power transmission unit 303 has transmitted an Analog Ping of the WPC standard via the power transmission coil 305. Then, the detection unit 304 may determine that an object is present in the range 104 if the voltage falls below a predetermined voltage value, or the current value exceeds a predetermined current value. As for determination as to whether the object is the RX or any other foreign object, the object is determined to be the RX if a predetermined response has been received to a Digital Ping subsequently transmitted by the communication unit 306 using In-band communication.

The communication unit 306 performs control communication in accordance with the WPC standard as described above with the RX, using In-band communication. The communication unit 306 modulates electromagnetic waves that are output from the power transmission coil 305, and transmits the information to the RX. The communication unit 306 demodulates the electromagnetic waves that have been output from the power transmission coil 305 and modulated in the RX, to obtain the information transmitted by the RX. That is, in the communication performed by the communication unit 306, the information is superposed on the power transmitted from the power transmission coil 305. The communication unit 306 may perform Out-of-band communication with the RX.

The display unit 307 presents the information to the user by any method such as a visual, audio, or tactile method. For example, the display unit 307 notifies the user of information indicating the state of the TX, or the state of the wireless power transfer system including the TX and the RX as shown in FIG. 1. The display unit 307 includes, for example, a liquid crystal display, an LED, a speaker, a vibration generation circuit, or another notification device. The operation unit 308 has accepting functionality of accepting an operation to the TX from the user. The operation unit 308 includes, for example, an audio input device such as a button, a keyboard, and a microphone, a motion detection device such as an acceleration sensor and a gyrosensor, or another input device. A device in which the display unit 307 and the operation unit 308 are integrated into one piece, such as a touch panel, may be used. As described above, the memory 309 stores various types of information. The memory 309 may store information obtained by a functional unit that is different from the control unit 301. The timer 310 measures time using, for example, a count up timer that measures the time elapsed from a time at which the timer was started, a count down timer that counts down from a set time, or the like.

(Flow of Processing Executed by Power Transmission Apparatus)

Figure 4:
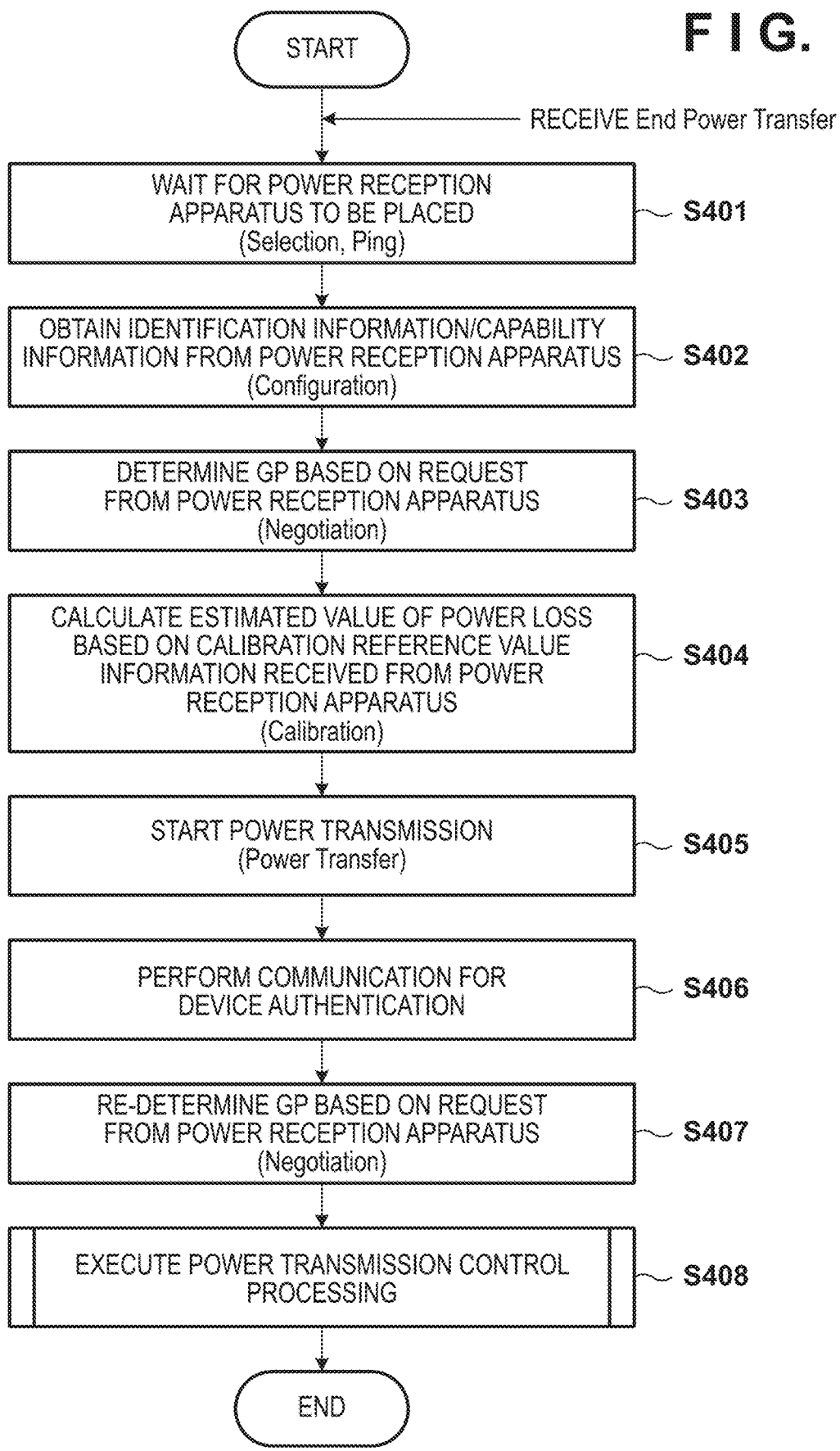
FIG. 4 is a flowchart illustrating an example of a flow of processing executed by the power transmission apparatus.

Next, an example of a flow of processing executed by the TX will be described. FIG. 4 shows an example of a flow of processing executed by the TX. The present processing may be implemented, for example, by the control unit 301 of the TX executing a program read from the memory 309. At least part of the following processing may be implemented with hardware. The hardware in this case may be implemented, for example, by using a predetermined compiler to automatically generate, from a program for implementing processing steps, a dedicated circuit including a gate array circuit such as an FPGA. The present processing may be executed in response to the TX being turned on, in response to the user of the TX inputting an instruction to start a wireless charging application, or in response to the TX being connected to the commercial power supply and receiving the power therefrom. Alternatively, the present processing may be started using another trigger.

In the present processing, the TX first executes processing defined as a Selection phase and a Ping phase in the WPC standard, and waits for the RX to be placed (S401). In these phases, the TX intermittently transmit an Analog Ping of the WPC standard in a repeated manner, and detects an object that is present in the power transmittable range. Then, if it is detected that an object is present in the power transmittable range, the TX transmits a Digital Ping of the WPC standard. If a predetermined response has been received to the Digital Ping, the TX determines that the detected object is the RX, and that the RX is placed on the charging stand 103.

If it is detected in S401 that the RX is placed, the TX obtains identification information and capability information from the RX, using communication in the Configuration phase defined in the WPC standard (S402). Here, the identification information of the RX includes a Manufacturer Code and a Basic Device ID. The capability information of the RX includes an information element capable of specifying the version of the corresponding WPC standard, a Maximum Power Value, which is a value specifying a maximum power that the RX can supply to a load, and information indicating whether or not the RX has the Negotiation function of the WPC standard. These are merely examples, and the identification information and the capability information of the RX may be replaced by other information, or may include other information in addition to the above-described information. For example, the identification information may be any other identification information capable of identifying an individual RX, such as a Wireless Power ID. The TX may obtain the identification information and the capability information of the RX by a method other than the communication in the Configuration phase of the WPC standard.

Subsequently, the TX performs a Negotiation with the RX, using communication in the Negotiation phase defined in the WPC standard, to determine a value of the GP (S403). The procedure performed in S403 is not limited to communication in the Negotiation phase of the WPC standard, and another procedure for determining the GP may be performed. If the TX obtains (e.g., in S402) information indicating that the RX does not correspond to the Negotiation phase, the TX may determine a value of the GP to be a small value (e.g., a value that is predefined in the WPC standard), without performing communication in the Negotiation phase.

After determining the GP, the TX performs calibration based on the determined GP (S404). Calibration is processing for calibrating, for power that has been transmitted by the TX to the RX, the correlation between a value of power transmission output, which is a value measured by the TX in self apparatus, and a value of received power, which is a value measured by the RX in self apparatus. For example, the TX estimates a power loss that can be determined as a difference between the value of power transmission output and the value of received power, based on the value of received power serving as a reference value for calibration, received from the RX, and the value of power transmission output that is set when the received power serving as the reference value is obtained. In the calibration processing, the transmission power of the TX and the received power of the RX may be obtained when the states of the RX are two states that are different from each other. Then, using the two sets of transmission power and received power, parameters for performing calibration for the received power or the transmission power during the actual wireless power transmission may be calculated. The parameters refer to a value of slope and a value of intercept when the correlation between the transmission power and the received power is graphically represented by a linear function. The combination used for calculating such parameters is not limited to sets of transmission power and received power, and may be sets of transmission power and a power loss, or may be sets of received power and a power loss.

Figure 9A:
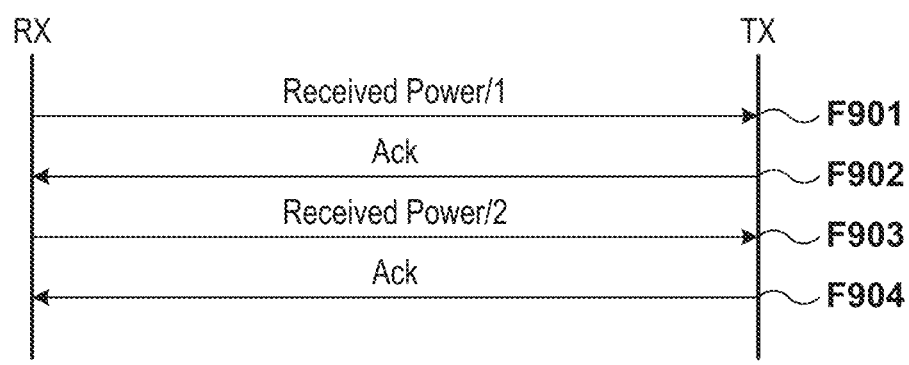
FIG. 9A is a diagram showing a communication sequence in a Calibration phase.

As shown in FIG. 9A, communication in the Calibration phase of the WPC standard is performed in the calibration. In this processing, as shown in FIG. 9A, first, the RX transmits, to the TX, information (hereinafter referred to as "first calibration reference value information") including received power in a light-load state that serves as a first calibration reference value (F901). Here, the first calibration reference value information is transmitted and received using, for example, Received Power (mode 1), which is a message defined in the WPC standard. However, another message may be used. The TX determines, based on its own power transmission state, whether or not to accept the first calibration reference value information. The TX transmits, to the RX, a positive acknowledgement (ACK) if the TX accepts the first calibration reference value information, and a negative acknowledgement (NAK) if the TX does not accept the first calibration reference value information (F902). Here, for example, the TX accepts the notification if the TX determines that its own power transmission state is stable, and does not accept the notification if the TX determines that its own power transmission state is unstable. The calibration reference value information accepted by the TX may be referred to as valid calibration reference value information. If the RX receives a NAK from the TX, the RX transmits the first calibration reference value information again. On the other hand, if the RX receives an ACK from the TX, the RX transmits, to the TX, information (hereinafter may be referred to as "second calibration reference value information") including received power in a load connection state that serves as a second calibration reference value (F903). Here, the second calibration reference value information is transmitted and received using, for example, Received Power (mode 2), which is a message defined in the WPC standard. However, another message may be used. The TX determines, based on its own power transmission state, whether or not to accept the second calibration reference value information. As in F902, the TX transmits to the RX, an ACK if the TX accepts the second calibration reference value information, and a NAK if the TX does not accept the second calibration reference value information (F904). If the RX receives a NAK from the TX, the RX transmits the second calibration reference value information again. Upon transmitting the ACK to the RX, the TX specifies, based on the received powers included in the first calibration reference value information and the second calibration reference value information, the respective power losses when the two reference values are used. Then, the TX estimates a power loss when received power of a value that is different from the two reference values is received, using a linear interpolation based on the two specified power loss values, for example. The TX may determine that the calibration has failed if the TX is unable to transmit an ACK as a response to the second calibration reference value information within a predetermined time after the completion of the Negotiation phase (S403), and may stop the power transmission. The calibration may be performed by a method other than that of the WPC standard.

After the completion of the calibration, the TX starts the power transmission (S405). The power transmission is performed through processing in the Power Transfer phase of the WPC standard. However, the power transmission is not limited thereto, and may be performed by a method other than that of the WPC standard.

Figure 9B:
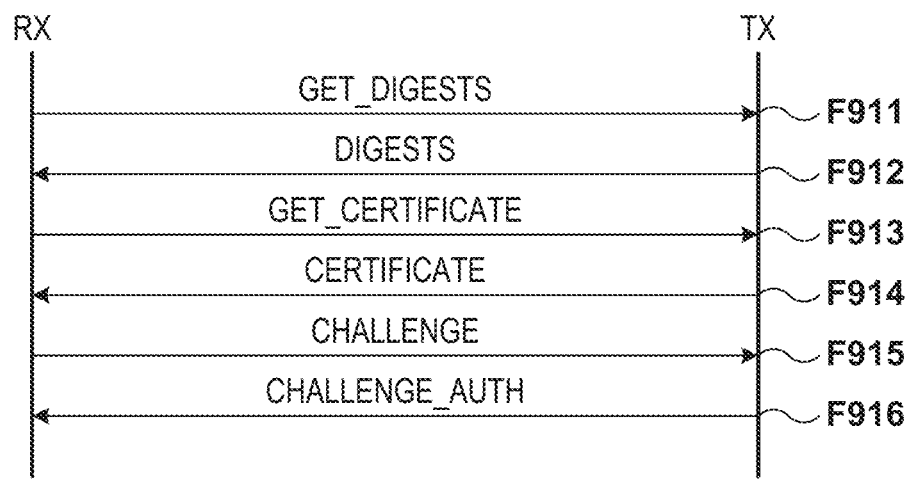
FIG. 9B is a diagram showing a communication sequence for device authentication.

Subsequently, the TX performs communication for device authentication with the RX (S406). Here, the communication for device authentication performed between the RX and the TX will be described with reference to FIG. 9B. It is assumed that the device authentication in the present embodiment is challenge-response device authentication using an electronic certificate, and that the RX authenticates the TX. The TX may authenticate the RX, or both the TX and the RX may authenticate the counterpart apparatus. The RX operates as an initiator that transmits a challenge text to the TX, and the TX operates as a responder that encrypts the challenge text received from the RX, and transmits the encrypted challenge text to the RX. First, the RX transmits a GET_DIGESTS message to the TX (F911). GET_DIGESTS is a message requesting information regarding the electronic certificate owned by the receiver (TX) of the message. In response to GET_DIGESTS, the TX transmits DIGESTS to the RX (F912). DIGESTS is a message including information regarding the electronic certificate owned by the transmitter (TX) of the message. Subsequently, the RX transmits, to the TX, a GET_CERTIFICATE message requesting detailed information regarding the electronic certificate (F913). In response to GET_CERTIFICATE from the RX, the TX transmits CERTIFICATE to the RX (F914). Then, the RX transmits, to the TX, a CHALLENGE message including the challenge text (F915), and the TX transmits, to the RX, CHALLENGE_AUTH resulting from encrypting the challenge text received from the RX (F916). The RX determines that the device authentication has succeeded if the correctness of CHALLENGE_AUTH received from the TX is verified, and determines that the device authentication has failed if the correctness cannot be verified. Upon completion of this determination, the device authentication processing ends.

If the initiator (RX) has received a message indicating that the counterpart apparatus (TX) does not support communication for device authentication, the initiator (RX) determines that the counterpart apparatus does not support device authentication. If the initiator (RX) has not received a response during the communication, the initiator (RX) may perform a retry, for example, by resending a message for obtaining the response, or may determine that the counterpart apparatus (TX) does not support device authentication. The RX may be configured to not to perform communication for device authentication with a TX that does not support device authentication, and not to determine a result of device authentication as successful. Here, it is assumed that device authentication has succeeded in S406.

Referring back to FIG. 4, the TX redetermines, together with the RX, a value of the GP through communication in the Negotiation phase defined in the WPC standard (S407). Here, because the device authentication in S406 has succeeded, the value of the GP is determined to be a value (e.g., 15 W) greater than 5 W. After redetermining the GP, the TX repeatedly executes power transmission control processing (S408). If End Power Transfer of the WPC standard has been received from the RX, the TX ends processing executed in whatever processing phase, in accordance with the WPC standard, and stops the power transmission before returning to the Selection phase in S401. End Power Transfer is also transmitted from the RX if a fully charged state has been reached. Accordingly, the TX returns to the Selection phase in S401.

An example of a flow of the power transmission control processing executed by the TX in S408 will be described with reference to FIG. 5. The present processing may be implemented, for example, by the control unit 301 of the TX executing a program read from the memory 309. At least part of the following processing may be implemented with hardware. The hardware in this case may be implemented, for example, by using a predetermined compiler to automatically generate, from a program for implementing processing steps, a dedicated circuit including a gate array circuit such as an FPGA.

Using the start of the processing as a trigger, the TX starts a timer to the completion of calculation of an estimated value of power loss (S501). The timer may be started, using the start of the present processing as a trigger, or in other words, using, as a trigger, the transmission of an ACK to Specific Request (hereinafter referred to as "SRQ/en") defined in the WPC standard and indicating the completion of communication in the Negotiation phase. However, the present disclosure is not limited thereto, and the timer may be started, for example, using, as a trigger, the completion of calculation of the estimated value of power loss, or the transmission of an ACK to the received calibration reference value information. Alternatively, the timer may be started at a timing at which SRQ/en is received. After starting the timer, the TX determines whether or not a power transmission output change instruction has been received from the RX (S502). Here, the power transmission output change instruction is performed by including Control Error Value, which is a value indicating a change amount of the voltage, in the Control Error message of the WPC standard. In Control Error Value, a positive value is stored if the power transmission output is to be increased, a negative value is stored if the power transmission output is to be reduced, and 0 is stored if the power transmission output is not changed. If the power transmission output change instruction has been received (YES in S502), the TX changes the power transmission output based on the instructed change amount (S503), and advances the processing to S504. On the other hand, if the power transmission output change instruction has not been received (NO in S502), the TX advances the processing to S504, without doing anything.

In S504, the TX determines whether or not received power information has been received from the RX. Here, the received power information is information including received power that has been actually received in the RX at that point of time. The received power information is transmitted and received using a Received Power (mode 0) message defined in the WPC standard. However, the present disclosure is not limited thereto. If the received power information has been received (YES in S504), the TX transmits an ACK (S505), and advances the processing to S506. On the other hand, if the received power information has not been received (NO in S504), the TX advances the processing to S506, without doing anything.

In S506, the TX determines whether or not enhanced calibration reference value information has been received from the RX. Here, the enhanced calibration reference value information is information including received power in a load connection state that serves a reference value for additional calibration for calculating an estimated value of power loss. If the enhanced calibration reference value information has been received (YES in S506), the TX advances the processing to S507, and if the enhanced calibration reference value information has not been received (NO in S506), the TX advances the processing to S511. In S507, the TX determines whether or not to accept the enhanced calibration reference value information received in S506. Here, the TX may determine whether or not to accept the enhanced calibration reference value information according to whether or not its own power transmission state is stable. However, the present disclosure is not limited thereto. For example, the TX may determine not to accept the enhanced calibration reference value information if the power loss in the received power indicated by the enhanced calibration reference value information deviates from a calculated estimated value of power loss by a predetermined value or more.

If the TX accepts the enhanced calibration reference value information (YES in S507), the TX calculates an estimated value of power loss based on the received power indicated by the enhanced calibration reference value information (S508), and transmits an ACK to the RX (S509). The calculation of an estimated value of power loss and the transmission of an ACK may be performed in the reversed order, or may be performed simultaneously (their processing periods may at least partially overlap). Then, the TX resets the timer (S513), and ends the processing. The estimated value of power loss is estimated based on, for example, a first power loss at first received power indicated by the enhanced calibration reference value information received in S506, and a second power loss estimated based on second received power indicated by the previous calibration reference value information. For example, from a value L1 of the first power loss corresponding to first received power P1, and a value L2 of the second power loss corresponding to second received power P2, the value of a power loss corresponding to received power P between P1 and P2 is calculated as (L2−L1)/(P2−P1)×(P−P1)+L1. However, the method for estimating a power loss is not limited to linear interpolation. For example, based on at least one calibration reference value information received in an after the Calibration phase, the estimated value of power loss may be calculated using statistical analysis such as linear approximation and polynomial approximation. The estimation method may be selected from these estimation methods according to the number of pieces of available calibration reference value information, and the computational resources of the TX. Accordingly, in the case where there are sufficient computational resources, a highly accurate estimated value can be calculated by performing statistical analysis using a larger number of pieces of calibration reference value information. In the case where computational resources are scarce, the computation time required for the calculation can be reduced by performing simple estimation such as linear interpolation.

On the other hand, if the TX does not accept the enhanced calibration reference value information (NO in S507), the TX transmits a NAK to the RX (S510), and determines whether or not a timeout has occurred (S511). The TX may determine whether or not a timeout has occurred, based on whether or not the calculation of the estimated value of power loss has been completed within a predetermined time after the timer has started in S501. That is, the TX may determine that a timeout has occurred, if a predetermined time has elapsed without receiving the enhanced calibration reference value information from the RX, or if a predetermined time has elapsed without transmitting an ACK to the enhanced calibration reference value information. Instead of or in addition to measuring time with the timer, the TX may determine whether or not the number of times of reception of the power transmission output change instruction received from the RX, or the number of times of reception of predetermined information that is different from the calibration reference value information, such as the received power information received from the RX, has become greater than or equal to a predetermined number of times. For example, in S501, when starting the timer, or instead of starting the timer, the TX may reset the number of times of reception of instructions or information to 0, count up the number of times of reception each time the TX receives an instruction or information, and determine, in S511, whether or not the number of times has reached a predetermined number of times. Instead of or in addition to measuring time with the timer, the TX may determine whether or not the number of times of transmission of NAK to the received enhanced calibration reference value information has become greater than or equal to a predetermined number of times. In this case as well, the TX may reset the number of times of transmission of NAK to 0 in S501, count up the number of times of transmission each time the TX transmits an NAK, and determine, in S511, whether or not the number of times has reached a predetermined number of times. If it is determined that a timeout has occurred (YES in S511), the TX executes timeout processing (S512). Upon completion of the timeout processing, the TX resets the timer (S513), and ends the present processing. The timeout processing in S512 will be described later. On the other hand, if it is determined that a timeout has not occurred (NO in S511), the TX returns the processing to S502.

Figure 5:
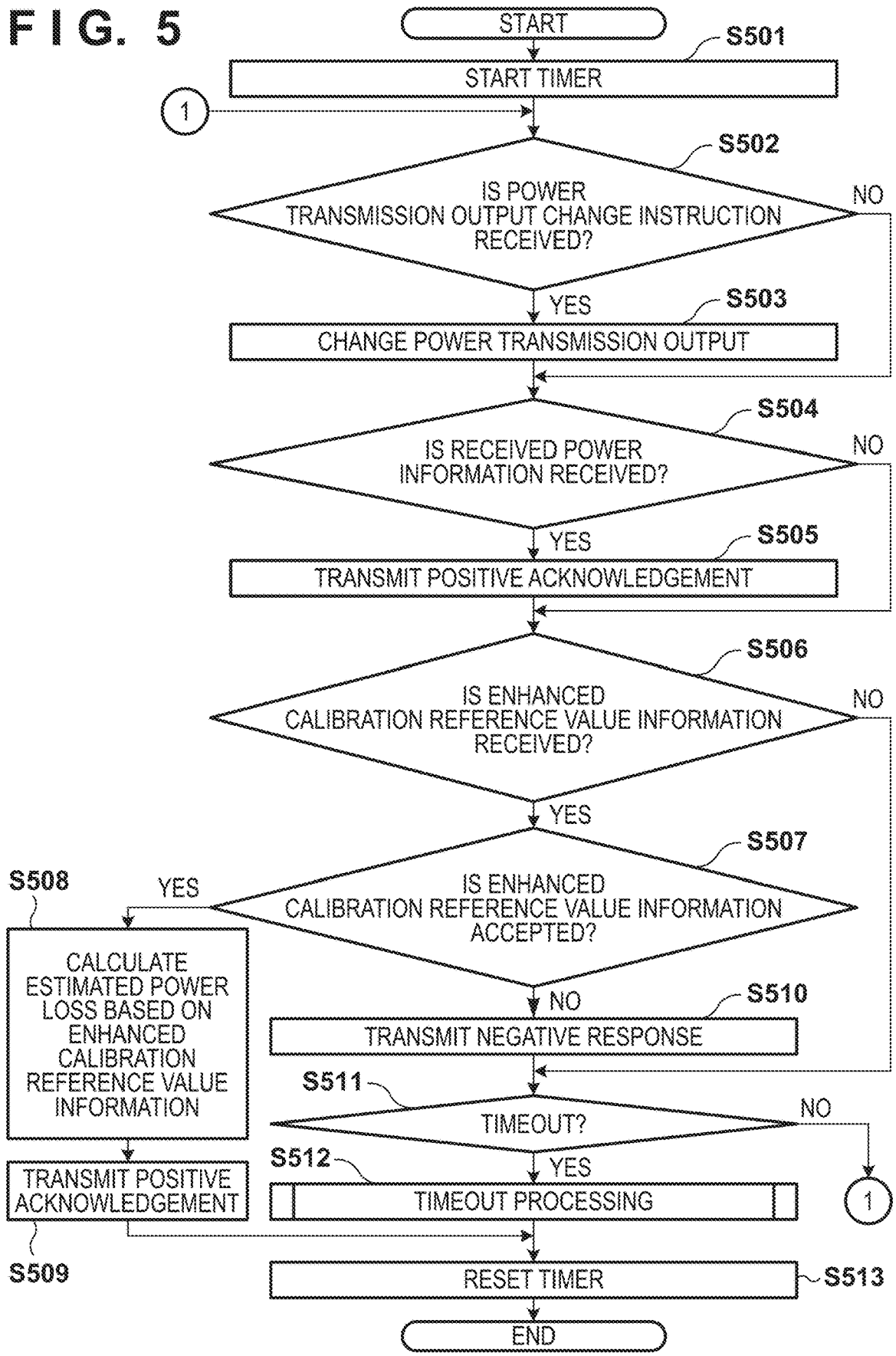
FIG. 5 is a flowchart illustrating an example of a flow of power transmission control processing executed by the power transmission apparatus.

As described above, the TX repeatedly executes the processing shown in FIG. 5. By repeatedly executing this processing, and sequentially updating the estimated value of power loss using the enhanced calibration reference value information, it is possible to prevent a reduction in the accuracy of foreign object detection by performing the foreign object detection based on the most recent estimated value of power loss. As a result, it is possible prevent suspension of charging due to erroneous detection of a foreign object, and a temperature increase caused by failing to detect a foreign object that is present, thus improving convenience. If the timer is reset in S513, the starting of the timer in S501 may be performed at that point in time. That is, the resetting and the restarting of the timer may be performed at the same timing. If valid calibration reference value information has been obtained, the timer may be reset, for example, at a predetermined timing associated with the timing of obtaining calibration reference value information, such as a timing at which the calibration reference value information is obtained, a timing at which an estimated value of power loss is calculated, and a timing at which an ACK is transmitted. During the timeout processing, the timer may be reset at a predetermined timing such as a reception timing of received power information indicating received power that has been reduced to a target value, a reception timing of valid enhanced calibration reference value information, and a transmission timing of an ACK to these pieces of information.

Figure 6A:
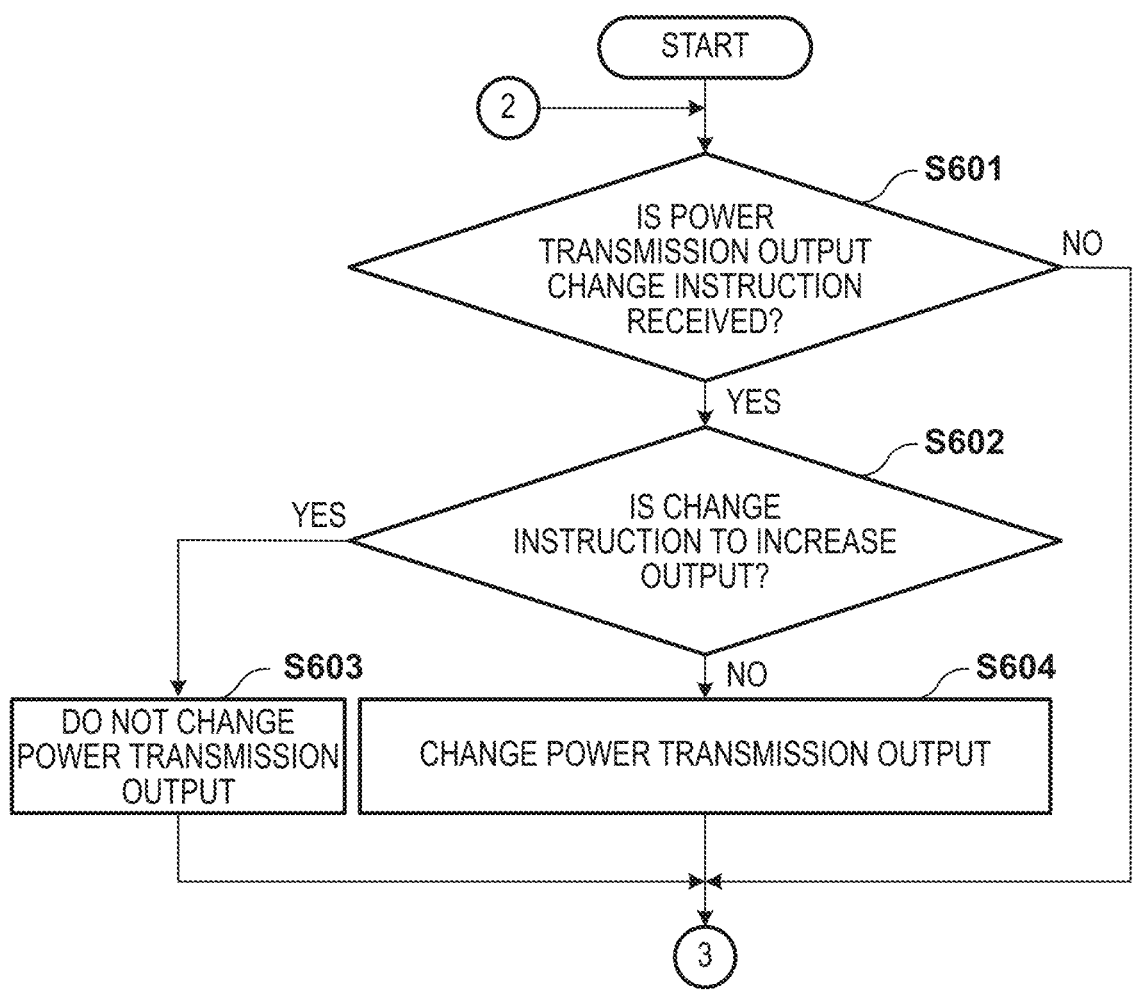
FIG. 6A is a flowchart illustrating an example of a flow of timeout processing executed by the power transmission apparatus.
Figure 6B:
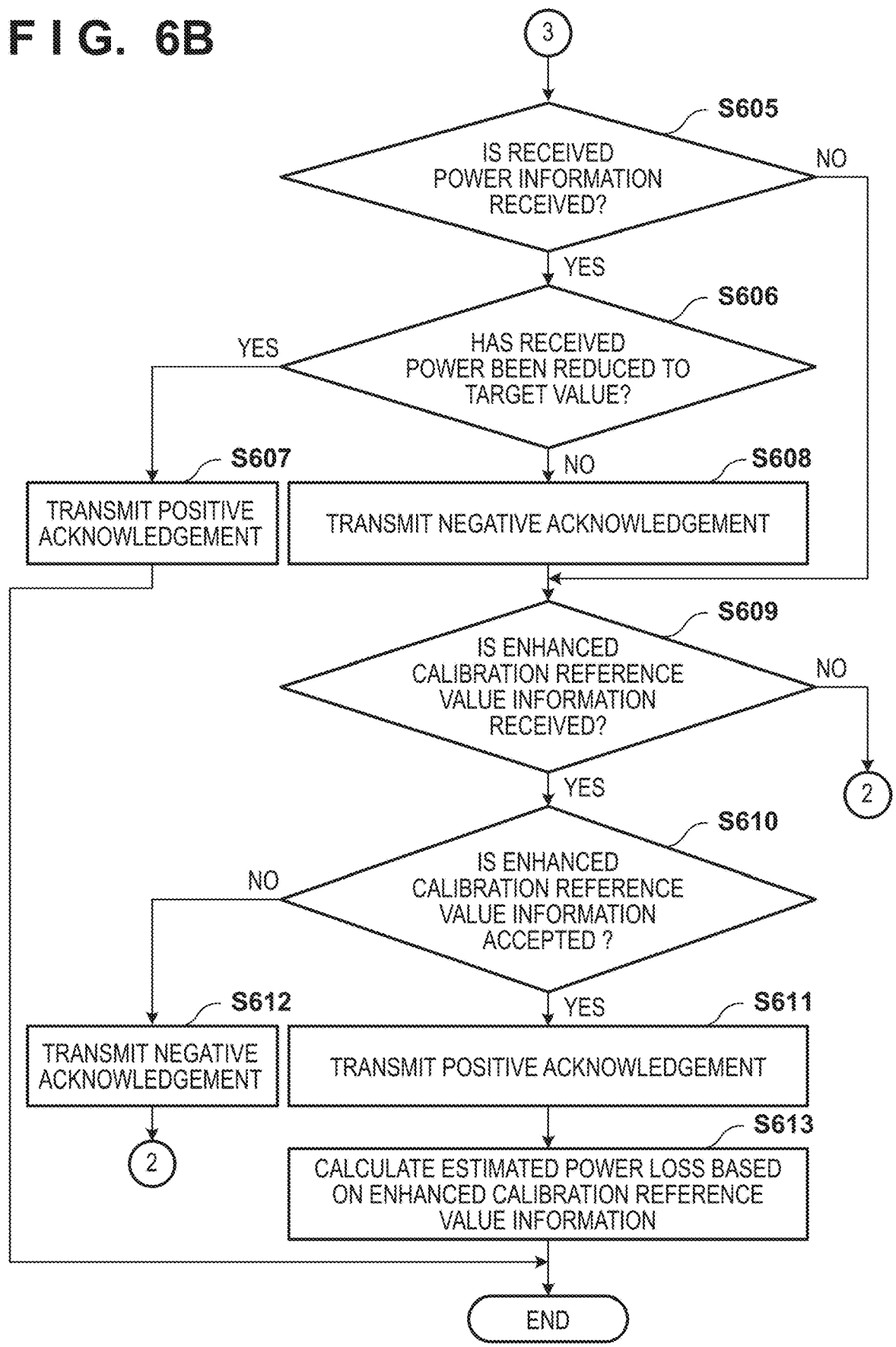
FIG. 6B is a flowchart illustrating the example of a flow of timeout processing executed by the power transmission apparatus.

Next, a flow of the timeout processing executed in S512 of FIG. 5 will be described with reference to FIGS. 6A and 6B. The present processing may be implemented, for example, by the control unit 301 of the TX executing a program read from the memory 309. At least part of the following processing may be implemented with hardware. The hardware in this case may be implemented, for example, by using a predetermined compiler to automatically generate, from a program for implementing processing steps, a dedicated circuit including a gate array circuit such as an FPGA.

After starting the processing, the TX determines whether or not a power transmission output change instruction has been received from the RX (S601). If the power transmission output change instruction has been received (YES in S601), the TX advances the processing to S602, and if the power transmission output change instruction has not been received (NO in S601), the TX advances the processing to S605. In S602, the TX determines whether the power transmission output change instruction is an instruction to increase the power transmission output, or in other words, whether a positive value is included in Control Error Value in the Control Error message, for example. If it is determined that the power transmission output change instruction indicates the increase of the power transmission output (YES in S602), the TX does not change the power transmission output (S603), and advances the processing to S605. That is, the TX is configured to not to follow the power transmission output change instruction to increase the power transmission output, in a situation where it is determined that a timeout has occurred, for example, based on that a certain time has elapsed without obtaining any new calibration reference value after updating the calibration reference value. In a situation where the accuracy of foreign object detection has been reduced as a result of the calibration reference value information lacking accuracy after an elapse of a long time after updating the calibration reference value, the TX may determine that no foreign object is present despite that the foreign object is present. Accordingly, it is possible to prevent a temperature increase or the like by configuring the TX to not to increase the power transmission output in an environment in which a foreign object is present, but there is a possibility that the presence thereof cannot be detected. On the other hand, if it is determined that the power transmission output change instruction is not an instruction instructing to increase the power transmission output (NO in S602), the TX changes the power transmission output based on the instructed change amount (S604), and advances the processing to S605.

In S605, the TX determines whether or not received power information has been received from the RX (S605). If the received power information has been received (YES in S605), the TX advances the processing to S606, and if the received power information has not been received (NO in S605), the TX advances the processing to S609. In S606, the TX determines, based on the received power information that has been received, whether or not the received power has been reduced to a target value. Here, the target value may be set to received power that falls within the range of the GP before the re-execution of the negotiation, but is not limited thereto. For example, the target value may be set to the received power indicated by the last accepted calibration reference value information (to which an ACK has been transmitted), the maximum received power among the received powers indicated by pieces of calibration reference value information that have been accepted in the past.

If it is determined that the received power has been reduced to the target value (YES in S606), the TX transmits an ACK (S607), and ends the present processing. On the other hand, if it is determined that the received power has not been reduced to the target value (NO in S606), the TX transmits a NAK (S608), and advances the processing to S609. In S609, the TX determines whether or not the enhanced calibration reference value information has been received. If it is determined that the enhanced calibration reference value information has been received (YES in S609), the TX advances the processing to S610, and if it is determined that the enhanced calibration reference value information has not been received (NO in S609), the TX returns the processing to S601. As in the cases of the first calibration reference value information and the second calibration reference value information, the TX determines whether or not to accept the enhanced calibration reference value information (S610). Then, if the TX accepts the enhanced calibration reference value information (YES in S610), the TX transmits an ACK (S611), calculates an estimated value of power loss based on the enhanced calibration reference value information (S613), and ends the present processing. On the other hand, if the TX does not accept the enhanced calibration reference value information (NO in S610), the TX transmits a NAK (S612), and returns the processing to S601. After the completion of the present processing, the TX advances the processing to S513, and thereafter repeatedly executes the processing shown in FIG. 5.

(Flow of Processing Executed by Power Reception Apparatus)

Figure 7:
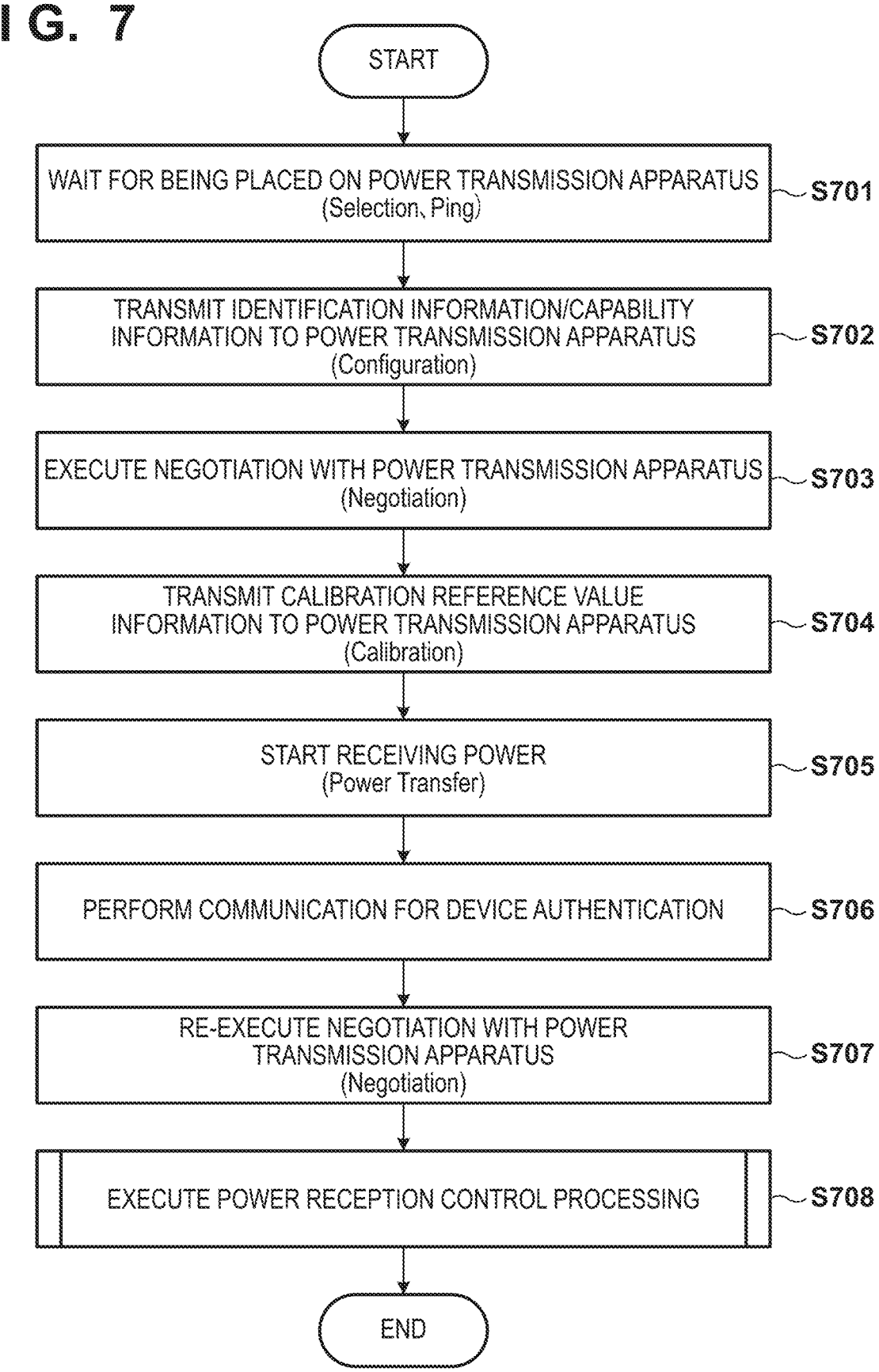
FIG. 7 is a flowchart illustrating an example of a flow of processing executed by the power reception apparatus.

Next, an example of a flow of the processing executed by the RX will be described. FIG. 7 shows an example of a flow of the processing executed by the RX. The present processing may be implemented, for example, by the control unit 201 of the RX executing a program read from the memory 209. At least part of the following processing may be implemented with hardware. The hardware in this case may be implemented, for example, by using a predetermined compiler to automatically generate, from a program for implementing processing steps, a dedicated circuit including a gate array circuit such as an FPGA. The present processing may be executed in response to the RX being started as a result of the RX having been turned on by the power supplied from the battery 202 or the TX, or in response to the user of the RX inputting an instruction to start a wireless charging application. Alternatively, the present processing may be started using another trigger.

After starting the processing, the RX executes processing defined as the Selection phase and the Ping phase in the WPC standard, and waits for self apparatus to be placed on the TX (S701). The RX detects that self apparatus is placed on the TX, for example, by detecting the Digital Ping from the TX. If it is determined that self apparatus is placed on the TX, the RX transmits, to the TX, identification information and capability information, using communication in the Configuration phase defined in the WPC standard (S702). After transmitting the RX transmits the identification information and the capability information, the RX determines a GP using communication in the Negotiation phase defined in the WPC standard (S703). Here, because the communication for device authentication has not been performed, the RX determines to perform a negotiation such that the GP is 5 W. Here, the RX performs, based on the determined GP, the communication in the Calibration phase of the WPC standard described with reference to FIG. 9A. Upon completion of the calibration, the RX start receiving power using the communication in the Power Transfer phase defined in the WPC standard (S705). After starting the power reception, the RX performs the communication for device authentication described with reference to FIG. 9B (S706). It is assumed that this device authentication has succeeded. Thereafter, the RX performs negotiation, and redetermines the value of the GP together with the TX (S707). Since the device authentication has succeeded, in S707, the RX determines a value (e.g., 15 W) greater than 5 W as the GP. After redetermining the GP, the RX repeatedly executes the power reception control processing (S708). The RX transmits End Power Transfer of the WPC standard if an error has occurred, or if a fully charged state has been reached. Accordingly, power transmission from the TX is stopped, and a series of processing for wireless charging ends.

Figure 8:
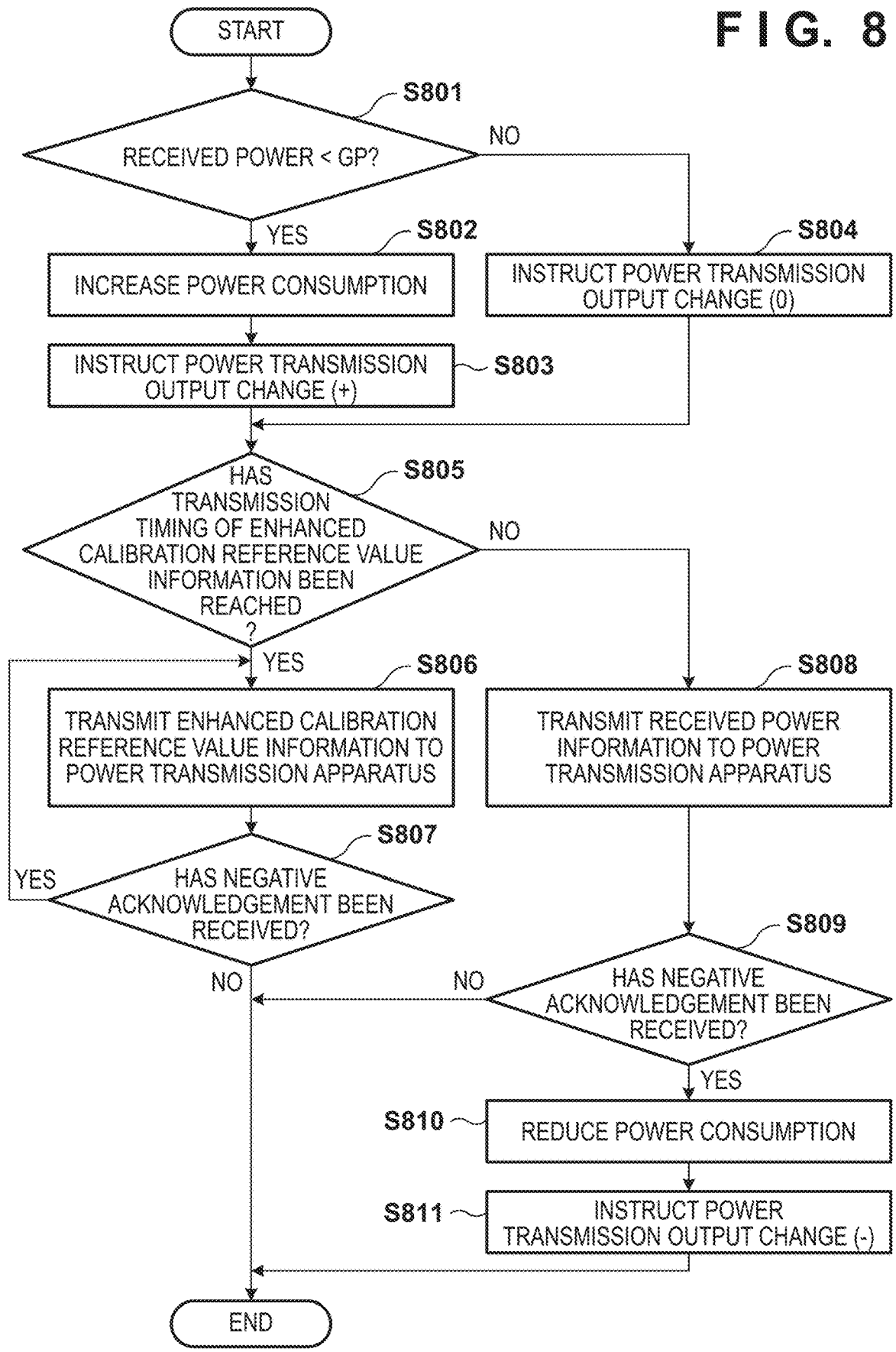
FIG. 8 is a flowchart illustrating an example of a flow of power reception control processing executed by the power reception apparatus.

Next, an example of a flow of the power reception control processing executed in S708 will be described with reference to FIG. 8. The present processing may be implemented, for example, by the control unit 201 of the RX executing a program read from the memory 209. At least part of the following processing may be implemented with hardware. The hardware in this case may be implemented, for example, by using a predetermined compiler to automatically generate, from a program for implementing processing steps, a dedicated circuit including a gate array circuit such as an FPGA.

After starting the processing, the RX determines whether or not the received power is smaller than the GP (S801). If it is determined that the received power is smaller than the GP (YES in S801), the RX increases the power consumption (S802), transmits, to the TX, a power transmission output change instruction instructing to increase the power transmission output (S803), and advances the processing to S805. On the other hand, if it is determined that the received power is greater than or equal to the GP (NO in S801), the RX does not change the power consumption, transmits, to the TX, a power transmission output change instruction instructing to maintain the power transmission output (S804), and advances the processing to S805.

In S805, the RX determines whether or not the transmission timing of the enhanced calibration reference value information has been reached. Here, the determination as to whether or not the transmission timing of the enhanced calibration reference value information has been reached may be performed based on whether or not a predetermined time has elapsed after completion of the negotiation. However, the present disclosure is not limited thereto. For example, the RX may perform the determination in S805 based on whether or not the time elapsed after the TX completed calculation of the estimated value of power loss and the RX received an ACK to the calibration reference value information has reached a predetermined time. Alternatively, the RX may perform the determination in S805 using an indicator other than an elapsed time. For example, the RX may determine whether or not the transmission timing of the enhanced calibration reference value information has been reached based on whether or not the difference between the received power upon completion of the negotiation and the present received power is greater than or equal to a threshold. The RX may determine whether or not the transmission timing of the enhanced calibration reference value information has been reached, using the difference between the received power indicated by the calibration reference value information to which an ACK has been most recently received, and the present received power. This allows the RX to reliably transmit the enhanced calibration reference value information to the TX, if there is a certain amount of change in the received power, or in other words, if it is envisaged that the estimated value of power loss in the TX has a large error.

If it is determined that the transmission timing of the enhanced calibration reference value information has been reached (YES in S805), the RX transmits enhanced calibration reference value information including the present received power (S806), and determines whether or not a NAK has been received from the TX (S807). If it is determined that a NAK to the transmitted enhanced calibration reference value information has been received from the TX (YES in S807), the RX retransmits the enhanced calibration reference value information (S806). If the NAK has been received, the RX may perform, using the display unit 207, performs display to prompt the user to, for example, re-place the RX. Accordingly, in the case where the power transmission in the TX is unstable, for example, due to the positional displacement of the RX, it is possible to re-execute predetermined processing for starting charging, thus restarting stable charging. On the other hand, if an ACK has been received to the enhanced calibration reference value information (NO in S807), the RX ends the present processing, without doing anything.

On the other hand, if it is determined that the transmission timing of the enhanced calibration reference value information has not been reached (NO in S805), the RX transmits the received power information to the TX, for example, at a predetermined time interval (S808), and determines whether or not a NAK has been received from the TX (S809). If a NAK to the transmitted received power information has been received from the TX (YES in S809), the RX reduces the power consumption (S810), transmits, to the TX, a power transmission output change instruction instructing to reduce the power transmission output of the TX (S811), and ends the present processing. On the other hand, if an ACK to the received power information has been received from the TX (NO in S809), the RX ends the present processing, without doing anything.

As a result of the RX periodically transmitting the enhanced calibration reference value information in an increasing phase or a decreasing phase of the power transmission output, it is possible to prevent a significant deviation between the received power of the calibration reference value and the actual received power. For example, when the power transmission output is increasing, if the calibration reference value information is notified to the TX from the RX within a certain period, the TX can obtain a new calibration reference value that is higher than the received powers of the previously obtained calibration reference values, and that does not significantly deviate from the received powers of these calibration reference values. Similarly, when the power transmission output is decreasing, if calibration reference value information is notified to the TX from the RX within a certain period, the TX can obtain a new calibration reference value that is lower than the received powers of the previously obtained calibration reference values, and that does not significantly deviate from the received powers of these calibration reference values. Also, by using such a new calibration reference value, the TX can accurately estimate the power loss as compared with when no such calibration reference value is available. In general, when the difference between the received power of the calibration reference value and the actual received power increases, it is anticipated that the error in estimation of the power loss also increases. In this respect, by notifying the calibration reference value information corresponding to the present received power to the TX from the RX within a certain period, the TX can obtain received power of a calibration reference value in a range that does not deviate from the received power of the existing calibration reference value above a certain level. As a result, for example, the TX can thoroughly obtain a wide range of calibration reference values for received power, so that the RX will not receive power that significantly deviates from the received power corresponding to the calibration reference value. This makes it possible to accurately estimate the power loss for any received power, thus preventing erroneous detection of a foreign object, and failure in detecting a foreign object that is present. If the TX is unable to obtain the enhanced calibration reference value information within a certain period in an increasing phase or a decreasing phase of the power transmission output, there is a possibility that the present received power significantly deviates from the received power of the calibration reference value. For this reason, timeout determination can be used, and the TX may be configured to not to increase (or reduce) the power transmission output if a timeout has occurred, and it is thus possible to prevent power transmission/reception with power that may reduce the accuracy of foreign object detection.

The processing operations associated with the timeout described above may be executed only in a situation where the power transmission output increases (or decreases) to such a degree that the received power in the RX exceeds the received power of the existing calibration reference value. The reason being that if the received power is within the range of the received power of the existing calibration reference value, accurate estimation of power loss can be performed without having to obtain an additional calibration reference value. The TX may set an expiration period for each of the calibration reference values, for example. Also, the TX may discard a reference value that has passed the set expiration period, and execute the above-described processing. For example, if the power transmission output is to be increased/decreased such that the received power changes beyond the range of the received power specified by the reference value that is held in the TX, the TX may execute the processing operations associated with the timeout described above.

(Flow of Processing Executed in System)

An operating sequence for a case where the TX and the RX execute the above-described processing will be described, assuming several situations. It is assumed that, in the initial state, the RX is not placed on the TX, and the TX has power transmission capability sufficient to execute power transmission with the GP requested from the RX.

Processing Example 1

First, a first processing example will be described with reference to FIGS. 10A and 10B. In the present processing example, the GP is determined as 5 W in the initial negotiation, and power transmission is started. Then, after the power transmission has been started, device authentication succeeds, and the GP is re-determined as 15 W by re-executing the negotiation. Using the completion of the negotiation as a trigger, or in other words, using, as a trigger, the transmission of an ACK to SRQ/en, the TX starts the timer. Also, it is assumed that, while the received power in the RX changes from 5 W to 15 W, the TX can neither receive the enhanced calibration reference value information and nor transmit an ACK within a predetermined time. At this time, the TX of the present processing example reduces the power transmission output, with the GP range before device authentication, which is 5 W, as a target value.

The TX waits for an object to be placed, using an Analog Ping (S401, F1001). As a result of the RX being placed (F1002), a change occurs in the Analog Ping (F1003), whereby the TX detects that an object is placed (F1004). From the subsequent Digital Ping, the RX detects that self apparatus is placed on the TX (S701, F1005, F1006). From a response to the Digital Ping, the TX detects that the object placed thereon is the RX. Subsequently, using communication in the Configuration phase, the TX obtains the identification information and the capability information from the RX (S402, S702, F1007). Next, the TX and the RX perform communication in the Negotiation phase (S403, S703, F1008). At this point, device authentication has not succeeded, and therefore the GP is determined as 5 W in this negotiation.

Subsequently, the TX and the RX start communication in the Calibration phase (S404, S704). In the communication in the Calibration phase, the TX receives, from the RX, first calibration reference value information indicating that the received power is 500 mW (F1009). Then, for example, as a result of determining that its own power transmission state is stable, the TX determines to accept the first calibration reference value information, and transmits an ACK (F1010). Next, the TX receives, from the RX, a power transmission output change instruction instructing to increase the power transmission output (F1011), and increases the power transmission output in accordance with the instruction (F1012). Thereafter, the TX receives, from the RX, second calibration reference value information indicating that the received power is 5 W (F1013). For example, as a result of determining that its own power transmission state is stable, the TX determines to accept the second calibration reference value information, and transmits an ACK (F1015). In addition, the TX calculates an estimated value of power loss, based on the first calibration reference value information and the second calibration reference value information (F1014). By the transmission of an ACK in F1015, the Power Transfer phase is started (S405, S705). Subsequently, communication for device authentication is performed (S406, S706, F1016). It is assumed that this device authentication has succeeded. If the device authentication has succeeded, the TX and the RX re-execute the communication in the Negotiation phase, and the GP is redetermined (S407, S707, F1017). Here, it is assumed that the GP is redetermined as 15 W. After the GP had been redetermined, the TX and the RX start the power transmission control processing and the power reception control processing, respectively (S408, S708).

After starting the power transmission control processing, the TX starts a timer set to the completion of calculation of an estimated value of power loss (S501, F1018). If a power transmission output change instruction instructing to increase the power transmission output is received from the RX, the TX increases the power transmission output in accordance with the instruction (S503, S802, S803, F1019, F1020). Subsequently, the TX receives, from the RX, received power information indicating that the received power is 15 W (S808, F1021), and transmits an ACK to the received power information (S505, F1022). If a power transmission output change instruction instructing not to change the power transmission output is received from the RX (S804, F1023), the TX follows the instruction, and does not change the power transmission output. Thereafter, the TX determines that a timeout has occurred, for example, using, as a trigger, the passage of a predetermined time since the start of the timer without the enhanced calibration reference value information being received, and starts the timeout processing (S512, F1024). After starting the timeout processing, if received power information indicating that the received power is 15 W is received from the RX (S808, F1025), the TX transmits a NAK in order to reduce the received power in the RX to 5 W, which is the target value (S608, F1026). The RX reduces the power consumption (S810, F1027), and transmits, to the TX, a power transmission output change instruction instructing to reduce the power transmission output (S811, F1028). If the power transmission output change instruction is received, the TX reduces the power transmission output in accordance with the instruction (S604, F1029). Subsequently, if received power information indicating that the received power is 10 W is received from the RX (S808, F1030), the TX transmits a NAK in order to cause the RX to continue reducing the received power because the received power is higher than 5 W, which is the target value (S608, F1031). The RX reduces the power consumption (S810, F1032), and transmits, to the TX, a power transmission output change instruction instructing to reduce the power transmission output (S811, F1033). If this power transmission output change instruction is received, the TX reduces the power transmission output in accordance with the instruction (S604, F1034). Thereafter, if received power information indicating that the received power is 5 W is received (S808, F1035), the TX transmits an ACK to the RX because the received power is greater than or equal to 5 W, which is the target value, and continues the power transmission with that output (S607, F1036).

According to the above-described operation, if an estimated value of power loss cannot be calculated after fast charging with a relatively high power transmission output has been started, the TX reduces the power transmission output to the output range before the start of fast charging. This makes it possible to continue power transmission and reception with an appropriate power transmission output, while assuming the possibility of occurrence of erroneous detection or detection failure of a foreign object. As a result of the RX periodically transmitting the enhanced calibration reference value information in an increasing phase or a decreasing phase of the power transmission output, it is possible to prevent a significant deviation between the received power of the calibration reference value and the actual received power. Accordingly, it is possible to accurately estimate power loss for received power that has been increased or reduced, thus preventing erroneous detection of a foreign object and failure in detecting a foreign object that is present. It is determined that a timeout has occurred if the TX is not able to obtain enhanced calibration reference value information within a certain period in an increasing phase or a decreasing phase of the power transmission output, and TX does not increase (or reduces) the power transmission output. This makes it possible to prevent power transmission and reception with power that may reduce the accuracy of foreign object detection.

Processing Example 2

Figure 11A:
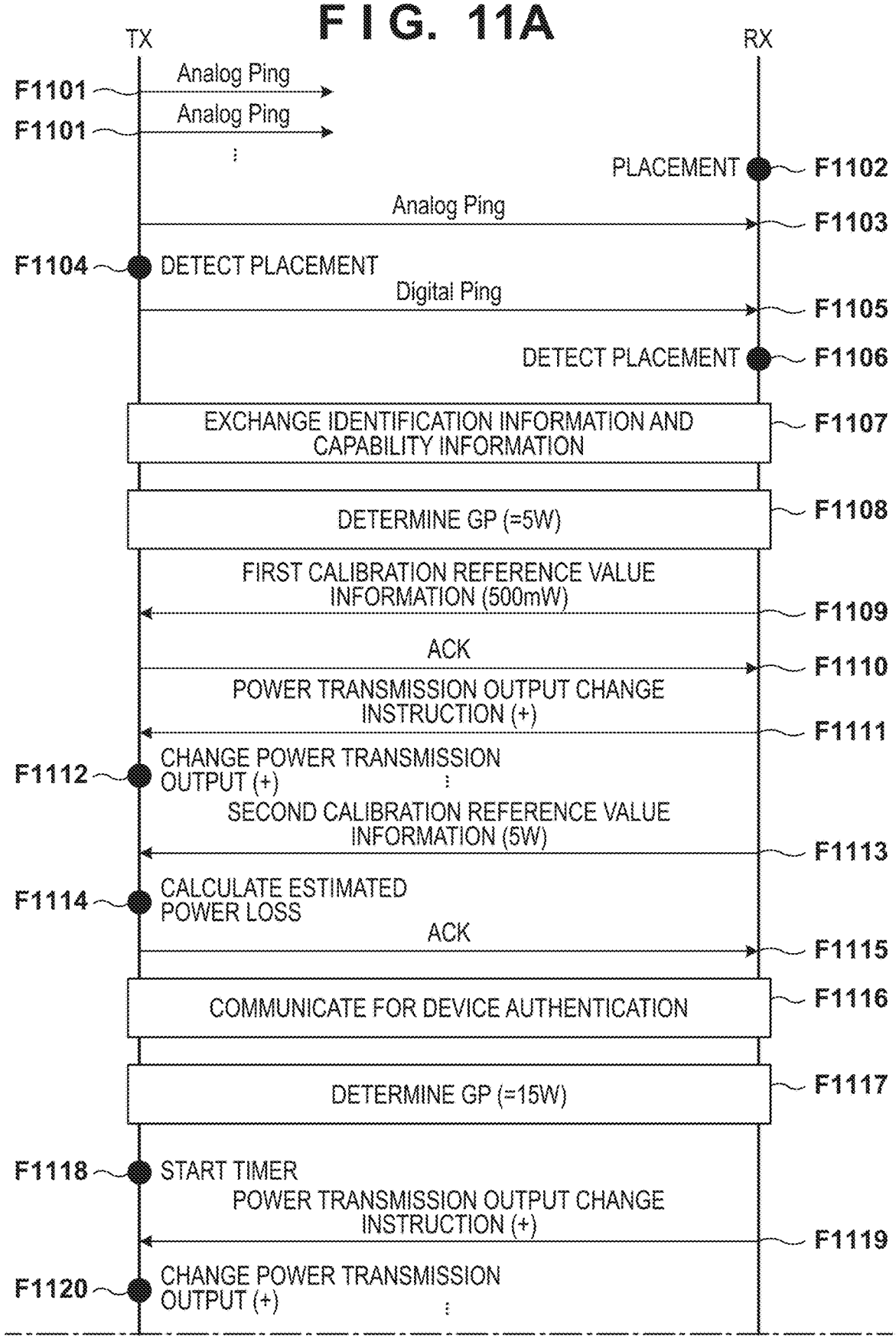
FIG. 11A is a diagram showing a second example of a flow of processing executed in the system.
Figure 11B:
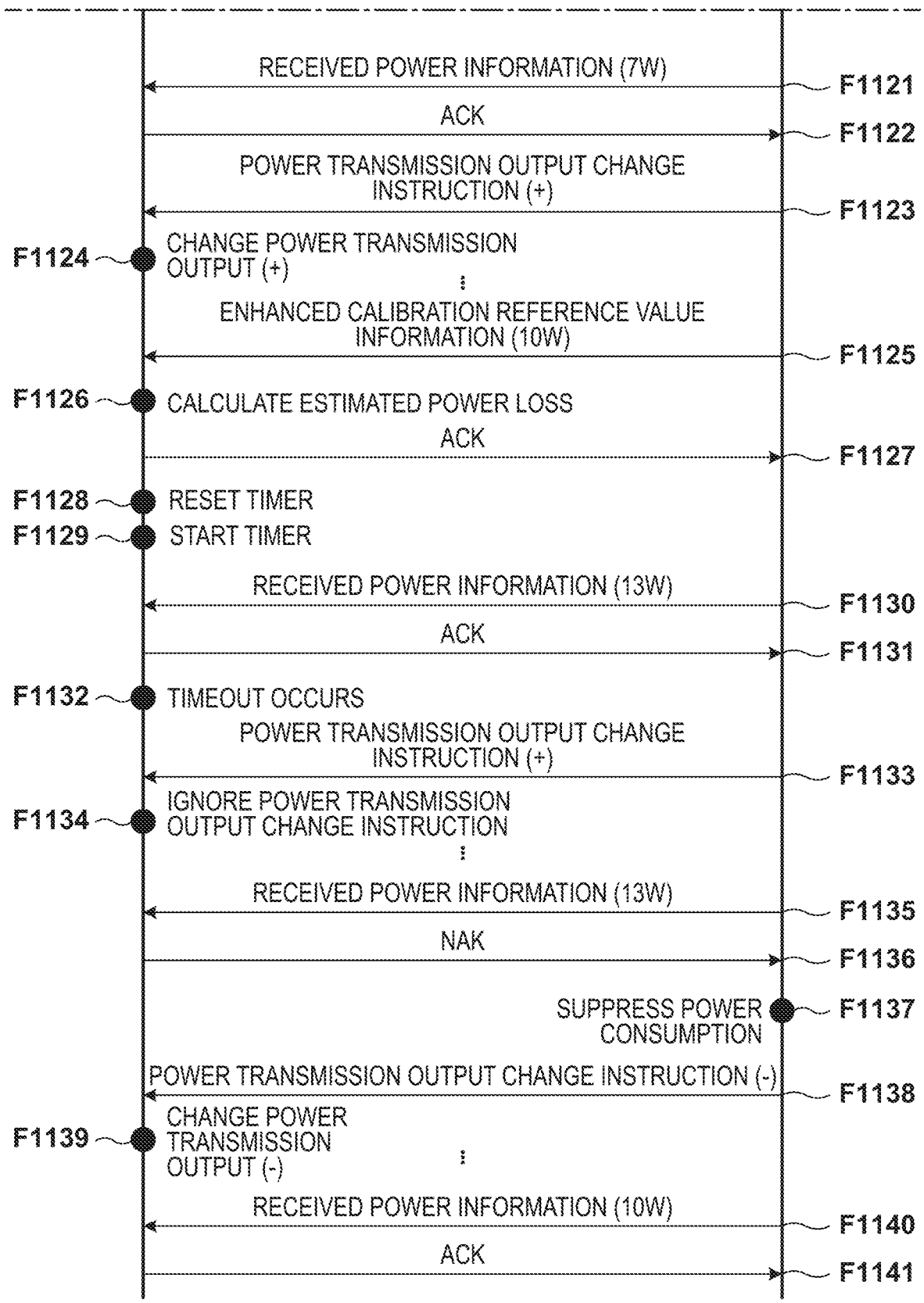
FIG. 11B is a diagram showing the second example of a flow of processing executed in the system.

Next, a second processing example will be described with reference to FIGS. 11A and 11B. In the present processing example, when a timeout has occurred, the TX reduces the power transmission output, using, as a target value, received power indicated by the immediately previously obtained valid enhanced calibration reference value information, unlike in Processing Example 1. Here, it is assumed that, when the received power in the RX changed from 5 W to 10 W after the GP has been determined, the TX receives enhanced calibration reference value information indicating that the received power of the RX is 10 W, calculates an estimated value of power loss, and transmits an ACK. In this case, the TX resets the timer, using as, a trigger, the transmission of the ACK, and starts the timer again. It is assumed that, thereafter, the received power in the RX changed from 10 W to 15 W, but the TX was not able to receive the enhanced calibration reference value information within a predetermined time. In this case, the TX reduces the power transmission output, using, as a target value, 10 W, which is the received power indicated by the last obtained valid enhanced calibration reference value information.

Figure 10A:
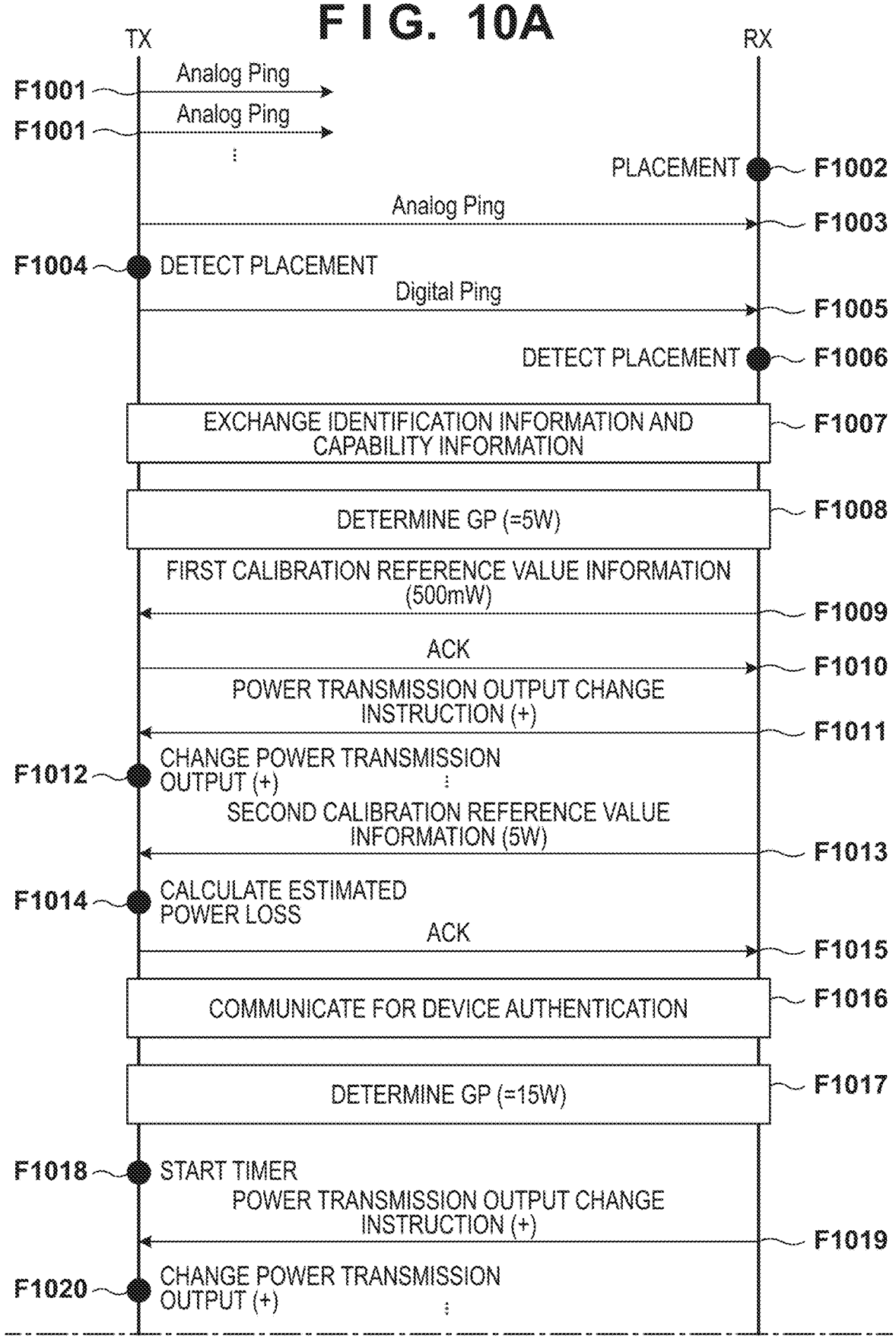
FIG. 10A is a diagram showing a first example of a flow of processing executed in the system.
Figure 10B:
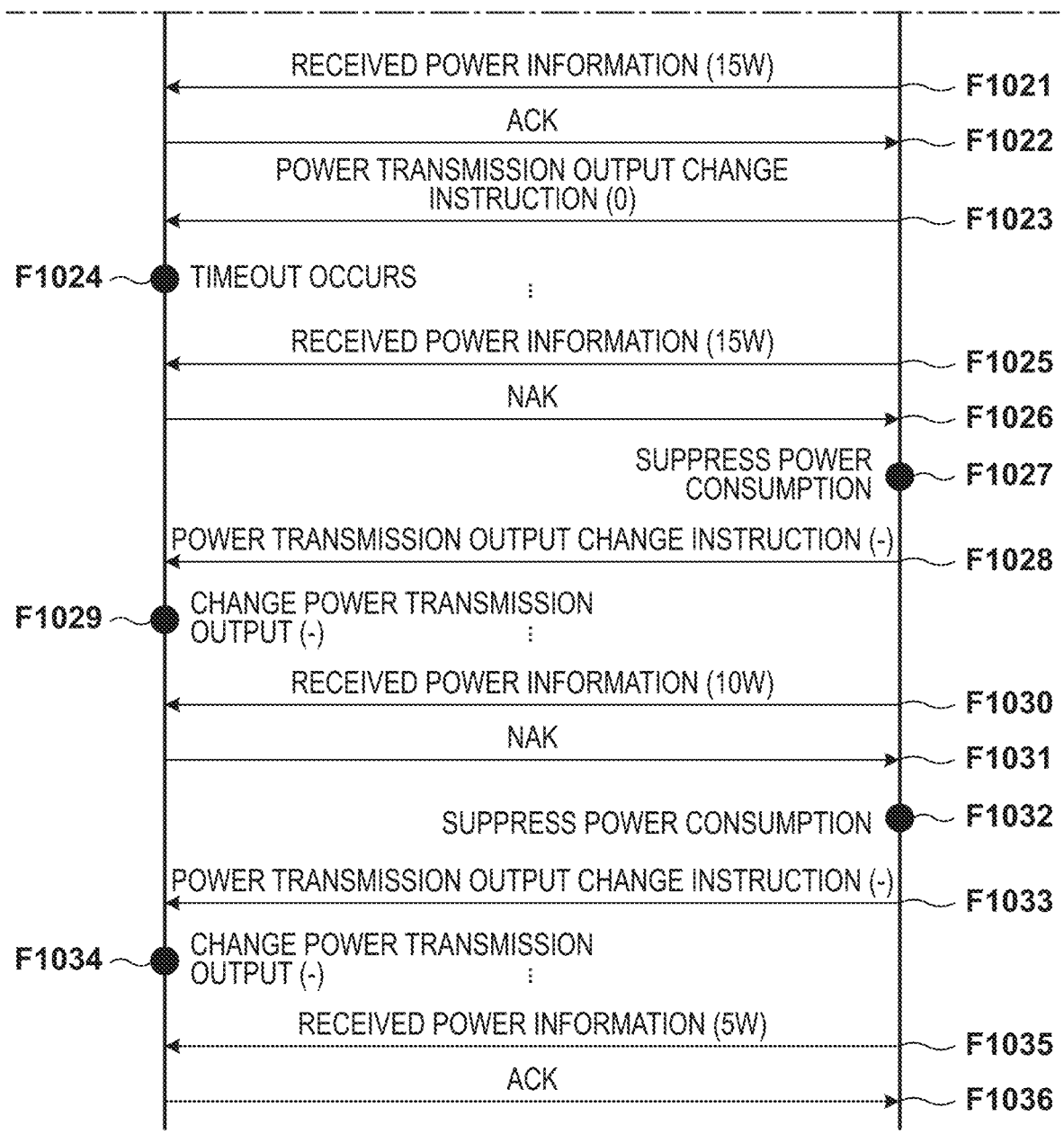
FIG. 10B is a diagram illustrating the first example of a flow of processing executed in the system.

The processing operations in F1101 to F1120 are the same as those in F1001 to F1020 in FIGS. 10A and 10B. Therefore, descriptions of these processing operations have been omitted.

In F1121, the RX transmits, to the TX, received power information indicating that the received power is 7 W (S808). If the received power information is received, the TX transmits an ACK because a timeout has not occurred at this point (S505, F1122). Since the received power has not reached the GP, the RX thereafter transmits, to the TX, a power transmission output change instruction instructing to increase the power transmission output (S802, S803, F1123). If the power transmission output change instruction is received, the TX increases the power transmission output in accordance with the instruction (S503, F1124).

Thereafter, the RX transmits, to the TX, enhanced calibration reference value information in response to the occurrence of a transmission timing of the enhanced calibration reference value information (S806, F1125). Here, the enhanced calibration reference value information indicates that the received power in the RX is 10 W. IF the enhanced calibration reference value information is received, the TX determines to accept the calibration reference value information, for example, as a result of determining that its own power transmission state is stable, calculates an estimated value of power loss (S508, F1126), and transmits an ACK (S509, F1127).

After transmitting the ACK, the TX resets the timer, and starts the timer again (S513, S501, F1128, F1129). Thereafter, the RX transmits, to the TX, received power information indicating that the received power is 13 W (S808, F1130). If the received power information has been received before the timer expires, the TX transmits an ACK (S505, F1131). Thereafter, the TX determines that a timeout has occurred, using, as a trigger, the passage of a predetermined time since the start of the timer in F1129 without the enhanced calibration reference value information being received, and starts the timeout processing (S512, F1132).

Since the received power has not reached the GP, the RX thereafter transmits, to the TX, a power transmission output change instruction instructing to increase the power transmission output (S802, S803, F1133). The TX receives the power transmission output change instruction, but does not follow the instruction because a timeout has already occurred, and does not change the power transmission output (S603, F1134). After this, the RX transmits, to the TX, received power information indicating that the received power is 13 W (S808, F1135). If the received power information is received, the TX transmits a NAK to the RX to cause the RX to reduce the received power to 10 W, which is the target value, because the timeout processing has already been started (S608, F1136). If the NAK is received, the RX reduces the power consumption (S810, F1137), and transmits, to the TX, a power transmission output change instruction instructing to reduce the power transmission output (S811, F1138). If the power transmission output change instruction is received, the TX reduces the power transmission output in accordance with the instruction (S604, F1139). Thereafter, the RX transmits, to the TX, received power information indicating that the received power has been reduced to 10 W as a result of the reduction in the power transmission output (S808, F1140). If the received power information indicating that the received power is 10 W is received, the TX transmits an ACK because the received power has been reduced to 10 W, which is the target value, or less (S607, F1041). Then, the TX continues the power transmission, while maintaining the power transmission output.

According to the above-described operation, if an estimated value of power loss cannot be calculated after fast charging with a relatively high power transmission output has been started, the TX reduces the power transmission output such that received power for which an estimated value of power loss has been calculated can be obtained. This makes it possible to continue power transmission and reception with an appropriate power transmission output, while assuming the possibility of occurrence of erroneous detection or detection failure of a foreign object. As a result of the RX periodically transmitting the enhanced calibration reference value information in an increasing phase or a decreasing phase of the power transmission output, it is possible to prevent a significant deviation between the received power of the calibration reference value and the actual received power. Accordingly, it is possible to accurately estimate power loss for received power that has been increased or reduced, thus preventing erroneous detection of a foreign object and failure in detecting a foreign object that is present. It is determined that a timeout has occurred if the TX is not able to obtain enhanced calibration reference value information within a certain period in an increasing phase or a decreasing phase of the power transmission output, and TX does not increase (or reduces) the power transmission output. This makes it possible to prevent power transmission and reception with power that may reduce the accuracy of foreign object detection.

The TX may start the above-described timer at a timing before the re-execution of the device authentication and the negotiation. For example, the TX may start the timer, using, as a trigger, the completion of calibration as a result of receiving the second calibration reference value information, or in other words, using, as a trigger, the transmission of an ACK to the second calibration reference value information. At this time, the TX may start the timer if the calibration has been completed with received power (e.g., 3 W) that is smaller than 5 W, which is the GP determined with a power reception apparatus that has not succeeded in device authentication. Then, if the TX is not able to receive enhanced calibration reference value information (e.g., indicating that the received power is 5 W, or the like) within a predetermined time, the TX reduces the power transmission output, using, as a target value, received power of 3 W indicated by the second calibration reference value information. By reducing the power transmission output to the output used at the time of completion of the calibration, which is before the start of fast charging, in this manner, it is possible to continue power transmission and reception with an appropriate output in a state in which the power transmission output is small, and thus error variation in general tends to be large.

The TX may start the above-described timer, using, as a trigger, the amount of change in received power becoming greater than or equal to a threshold. That is, the TX may be configured to not to execute the processing operations associated with the timeout shown in FIG. 5, or FIGS. 6A and 6B, before the amount of change in received power becomes greater than or equal to a threshold. For example, the TX may start the timer, using, as a trigger, the reception of received power information or calibration reference value information indicating that the amount of change in received power from the received power immediately after the completion of the calibration is greater than or equal to a threshold, or using, as a trigger, the transmission of a response to the received power information or calibration reference value information. The TX may start the timer, using, as a trigger, the reception of received power information or calibration reference value information indicating that the amount of change in received power from the received power when the valid enhanced calibration reference value information is obtained is greater than or equal to a threshold, or using, as a trigger, the transmission of a response to the received power information or calibration reference value information. The TX may start the timer, using, as a trigger, the reception of received power information or calibration reference value information indicating that the amount of change in received power from any of the received powers indicated by the valid calibration reference value information is greater than or equal to a threshold, or using, as a trigger, the transmission of a response to the received power information or calibration reference value information. Accordingly, in the case where the change from the received power for which an estimated value of power loss has been calculated is insignificant, and thus the accuracy of foreign object detection is considered to be sufficiently ensured, it is possible to suppress the occurrence of unnecessary timeout and unnecessary changing of the power transmission output. As the threshold for the amount of change in received power, a predetermined fixed value may be used, or a value determined between the TX and the RX using any communication performed before starting the Power Transfer phase may be used. The TX may be configured to not to execute the processing operations associated with the timeout shown in FIG. 5, or FIGS. 6A and 6B, before the amount of change in received power after the valid enhanced calibration reference value information has been obtained becomes greater than or equal to a threshold.

The TX may start the above-described timer, using, as a trigger, the amount of change in power transmission output becoming greater than or equal to a threshold. That is, the TX may be configured to not to execute the processing operations associated with the timeout shown in FIG. 5, or FIGS. 6A and 6B, before the amount of change in power transmission output becomes greater than or equal to a threshold. For example, the TX may start the timer, using, as a trigger, the amount of change from the power transmission output immediately after the completion of the calibration becoming greater than or equal to a threshold, or using, as a trigger, the amount of change in power transmission output from the power transmission output when the valid calibration reference value information is obtained becoming greater than or equal to a threshold. In an example, the TX may start the timer if a value that is increased by 1 when the power transmission output is increased by the above-described power transmission output change instruction, and that is reduced by 1 when the power transmission output is reduced by the power transmission output change instruction, has reached a predetermined positive value or a predetermined negative value. In the case where a value indicating the amount by which the power transmission output is to be changed by the power transmission output change instruction is designated, the TX may cumulatively add the designated value, and may start the timer when the value has reached a predetermined positive value or a predetermined negative value. The TX may monitor its own power transmission output, and may start the timer, using, as a trigger, the amount of change reaching a predetermined value. Accordingly, in the case where the change in power transmission output and also the change in received power after an estimated value of power loss has been calculated are assumed to be insignificant, it is possible to suppress the occurrence of unnecessary timeout and unnecessary changing of the power transmission output. The TX may be configured to not to execute the processing operations associated with the timeout shown in FIG. 5, or FIGS. 6A and 6B, before the amount of change in power transmission output after the valid enhanced calibration reference value information has been obtained becomes greater than or equal to a threshold.

The TX may start the above-described timer, using, as a trigger, the reception of the enhanced calibration reference value information after an estimated value of power loss has been calculated. That is, the TX may be configured to not to execute the processing operations associated with the timeout shown in FIG. 5, or FIGS. 6A and 6B, before enhanced calibration reference value information is received. Accordingly, a timeout can be provided only when the RX intends to calculate an estimated value in the case where foreign object detection can be performed using a calculated estimated value of power loss. This makes it possible to suppress the occurrence of unnecessary timeout, and unnecessary changing of the power transmission output.

The enhanced calibration reference value information may be transmitted when performing power transmission and reception that falls outside the range of the received reference value of received power. In this case, the expression "falls outside the range of . . . reference value" includes both falling below a lower limit that defines the range, and exceeding an upper limit that defines the range of the reference value.

The enhanced calibration reference value information may be transmitted if the GP is increased as a result of device authentication (Authentication) using an electronic certificate on the power transmission apparatus, or device authentication (Authentication) using an electronic certificate on the power reception apparatus having succeeded.

For example, in the case where power transmission and reception is performed for an extended period of time, the accuracy of the foreign object detection processing using a calibration reference value obtained in the calibration phase may be reduced due to an influence of heat generation or the like. For this reason, if a certain amount of time has elapsed after the calibration reference value has been obtained, a calibration reference value may be obtained as the enhanced calibration reference value information. For example, the TX may request the enhanced calibration reference value information from the RX.

The enhanced calibration reference value information may be transmitted if the received power in the power reception apparatus changes to a value exceeding a predetermined value.

The TX need not start the above-described timer if a predetermined condition is satisfied. That is, the TX may be configured to not to execute the processing operations associated with the timeout shown in FIG. 5, or FIGS. 6A and 6B, while a predetermined is not satisfied. The TX may be configured to not to start the timer, for example, if power transmission and reception is performed with received power closer to the received power indicated by the valid calibration reference value information obtained in the past, or if power transmission and reception is performed with received power within a range in which an estimated value is calculated using a plurality of pieces of calibration reference value information. The TX may be configured to not to start the timer if the number of times that an estimated value has been calculated using the valid calibration reference value information obtained in the past becomes greater than or equal to a predetermined number of times. Accordingly, in the case where the accuracy of foreign object detection is sufficiently ensured, it is possible to suppress the occurrence of unnecessary timeout and unnecessary changing of the power transmission output.

In the above-described example, after a timeout has occurred, the target value is set within the range of the received power for which an estimated value of power loss has been calculated. However, received power that is outside the aforementioned range and whose difference from the received power for which an estimated value of power loss has been calculated is less than a threshold may be used as the target value. This makes it possible to continue charging that is as fast as possible without significantly affecting the accuracy of foreign object detection using a calculated estimated value.

In the above-described example, after a timeout has occurred, the TX changes the power transmission output such that the received power has the target value. However, a negotiation may be performed again between the TX and the RX, and the GP may be changed to the target value. At this time, the negotiation is performed such that the target value is a value within the range from a minimum value to a maximum value of the received power indicated by the valid calibration reference value information. Accordingly, a maximum value of the received power that can be received by the RX can be kept at a target value or less, thus making it possible to continue charging while suppressing a reduction in the accuracy of foreign object detection.

After a timeout has occurred, the TX may determine that some problem occurs in the charging processing, and stop the power transmission. This makes it possible to suppress the occurrence of a problem caused by an undetected foreign object, erroneous operation, or the like. After stopping the power transmission, the TX may return the processing to the Selection phase in S401. Accordingly, if it is difficult to continue power transmission, for example, due to the positional displacement of the RX, it is possible to re-execute predetermined processing for stating charging, thus resuming charging appropriately. If an abnormality is detected, the TX may limit power transmission so as to reduce the power to be transmitted.

In the above-described example, after a timeout has occurred, the TX transmits a NAK to the RX to the received power information in order to change the power transmission output such that the received power has the target value. At this time, the TX may transmit a response including additional information. For example, the TX may include, in the NAK to be transmitted, a notification to change the power transmission output, a reason for changing the power transmission output, the target value of received power, a criterion for determining a timeout, a request for transmission of additional calibration reference value information, and so forth. These pieces of information may be transmitted using a separate response signal/message that is different from the NAK. All pieces of the additional information may be transmitted using one response signal or message, or the additional information may be transmitted using a plurality of response signals or messages in a distributed manner. Such additional information allows the RX to use, for example, the display unit 207 to notify, via a display or the like, the user that fast charging is limited, and it is thus possible to improve the user convenience. Furthermore, the RX can transmit additional calibration reference value information, using the reception of the additional information as a trigger, and it is thus possible to avoid changing of the power transmission output in the TX, and continue fast charging.

After a timeout has occurred, the TX may use the display unit 307 to make an inquiry to the use as to whether or not to continue fast charging, and may determine whether or not to change the power transmission output in accordance with an instruction received via the operation unit 308. For example, the TX may be configured to transmit an ACK to the received power information without changing the power transmission output, if an instruction to continue fast charging is given within a predetermined time since the inquiry has been started. This processing may be performed using the display unit 207 and the operation unit 208 of the RX. For example, the RX may be configured to start the inquiry to the user, using, as a trigger, the reception of the above-described additional information, and may be configured to not to transmit a power transmission output change instruction instructing to reduce the power transmission output, if an instruction to continue fast charging is given within a predetermined time. Accordingly, in the case where the user can determine that incorporation of a foreign object or the like has not occurred, it is possible to suppress unnecessary changing of power transmission output, thus continuing fast charging.

In the above-described example, when increasing the received power in the RX, the power transmission output is reduced (or not increased) if the calibration reference value information has not been accepted for a predetermined time or longer. The same processing may also be executed when reducing the received power in the RX. That is, the target value for changing the power transmission output may be received power that is larger than the received power at that time, and the TX may increase the power transmission output such that the received power in the RX is increased. For example, the TX may use, as the target value, the largest received power of all the received powers indicated by the valid calibration reference value information obtained in the past. In this case, the RX transmits, to the TX, a power transmission output change instruction instructing to increase the power transmission output. This makes it possible to continue charging that is as fast as possible, with received power that enables accurate detection of a foreign object.

In the above-described example, the TX calculates an estimated value of power loss. However, the present disclosure is not limited thereto. That is, the TX need only obtain information for associating a power transmission output and received power in the RX that can be obtained at the power transmission output. For example, the TX need only obtain a combination of received power Pr1 of a first calibration reference value and a power transmission output Pt1 at that time, and a combination of received power Pr2 of a second calibration reference value and a power transmission output Pt2 at that time. In this case as well, for example, for received power Pr3 between Pr1 and Pr2, a value obtained by (Pt2−Pt1)/(Pr2−Pr1)×(Pr3−Pr1)+Pt1, and the actual transmission power may be compared, and it can be detected that a foreign object is present, if the absolute value of the difference exceeds a predetermined value.

According to the present disclosure, it is possible to improve convenience of wireless power transfer.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

The invention claimed is:

1. A power transmission apparatus comprising:
a power transmission unit configured to wirelessly transmit power to a power reception apparatus; and
a communication unit configured to communicate with the power reception apparatus,
wherein the communication unit receives first information which means calibration information and which includes information on first received power,
wherein the communication unit receives second information which means calibration information and which includes information on second received power after the communication unit receives the first information,
wherein the communication means receives third information including information on third received power after the communication means receives the second information, and
wherein the power transmission unit performs processing for limiting power transmission in a case where difference between the second received power and the third received power is greater than a threshold and a predetermined time has elapsed since a timing at which the communication unit received the third information, without receiving fourth information which means calibration information and which includes information on fourth received power.

2. The power transmission apparatus according to claim 1, wherein the processing for limiting power transmission is processing to limit power until received power is limited to the second received power.

3. The power transmission apparatus according to claim 1, further comprising
an execution unit configured to execute authentication with the power reception apparatus,
wherein the processing for limiting power transmission is processing to limit power until received power is limited to received power that is to be received in an apparatus that has not succeeded in authentication.

4. The power transmission apparatus according to claim 1, wherein the processing for limiting power transmission is processing to transmit a negative acknowledgement to cause the power reception apparatus to transmit control error value information to reduce power.

5. The power transmission apparatus according to claim 1, wherein the processing for limiting power transmission is processing to prevent power from being increased even if control error value information for increasing the power has been received from the power reception apparatus.

6. The power transmission apparatus according to claim 1, wherein the processing for limiting power transmission is processing to stop power.

7. The power transmission apparatus according to claim 1, wherein the processing for limiting power transmission is processing to prevent power from being increased.

8. The power transmission apparatus according to claim 1, further comprising a processing unit configured to execute detection processing for detecting a foreign object while power transfer to the power reception apparatus is in progress.

9. The power transmission apparatus according to claim 8, wherein the processing unit executes the detection processing based on the first information and the second information.

10. A power transmission apparatus, comprising:
a power transmission unit configured to wirelessly transmit power to a power reception apparatus; and
a communication unit configured to communicate with the power reception apparatus,
wherein the communication unit receives first information which means calibration information and which includes information on first received power,
wherein the communication unit receives second information which means calibration information and which includes information on second received power after the communication unit receives the first information,
wherein the communication means receives third information including information on third received power after the communication means receives the second information, and
wherein the power transmission unit performs processing for limiting power transmission in a case where difference between the second received power and the third received power is greater than a threshold and a predetermined time has elapsed since a timing at which a response to the third information is transmitted to the power reception apparatus, without receiving fourth information which means calibration information and which includes information on fourth received power.

11. A power transmission apparatus, comprising:
a power transmission unit configured to wirelessly transmit power to a power reception apparatus; and
a communication unit configured to communicate with the power reception apparatus,
wherein the communication unit receives first information which means calibration information and which includes information on first received power,
wherein the communication unit receives second information which means calibration information which includes information on second received power after the communication unit receives the first information,
wherein the communication unit receives control error value information from the power reception apparatus, and
wherein the power transmission unit performs specific processing for limiting power transmission in a case where a predetermined time has elapsed since a timing at which an amount of change in power caused based on the control error value information, from transmitted power when the communication unit receives the second information, is greater than a threshold, or a timing at which a response to the control error value information is transmitted to the power reception apparatus, without receiving third information which means calibration information and which includes information on third received power.

12. A method for a power transmission apparatus, comprising:
receiving first information which means calibration information and which includes information on first received power;
receiving second information which means calibration information and which includes information on second received power after the communication unit receives the first information;
receiving third information including information on third received power after reception of the second information, and
performing processing for limiting power transmission in a case where difference between the second received power and the third received power is greater than a threshold and a predetermined time has elapsed since a timing at which the third information was received, without receiving fourth information which means calibration information and which includes information on fourth received power.

* * * * *